(12) United States Patent
Shimoyama et al.

(10) Patent No.: US 11,761,837 B2
(45) Date of Patent: Sep. 19, 2023

(54) MULTI-AXIAL TACTILE SENSOR

(71) Applicant: The University of Tokyo, Tokyo (JP)

(72) Inventors: Isao Shimoyama, Tokyo (JP); Akihito Nakai, Tokyo (JP)

(73) Assignee: The University of Tokyo, Tokyo (JP)

( * ) Notice: Subject to any disclaimer, the term of this patent is extended or adjusted under 35 U.S.C. 154(b) by 311 days.

(21) Appl. No.: 17/295,267

(22) PCT Filed: Nov. 26, 2018

(86) PCT No.: PCT/JP2018/043439
§ 371 (c)(1),
(2) Date: May 19, 2021

(87) PCT Pub. No.: WO2020/110181
PCT Pub. Date: Jun. 4, 2020

(65) Prior Publication Data
US 2022/0011184 A1     Jan. 13, 2022

(51) Int. Cl.
*G01L 5/162*     (2020.01)
(52) U.S. Cl.
CPC .................... *G01L 5/162* (2013.01)
(58) Field of Classification Search
CPC ............................. G01L 5/162; G01P 15/123
See application file for complete search history.

(56) References Cited

U.S. PATENT DOCUMENTS

| | | | | |
|---|---|---|---|---|
| 4,577,513 A | * | 3/1986 | Harwood | G01L 3/1457 414/730 |
| 4,836,034 A | * | 6/1989 | Izumi | G01L 5/162 73/862.044 |
| 4,911,023 A | * | 3/1990 | Izumi | G01L 5/162 73/862.044 |
| 4,951,510 A | * | 8/1990 | Holm-Kennedy | G01P 15/0802 73/514.31 |

(Continued)

FOREIGN PATENT DOCUMENTS

| | | |
|---|---|---|
| JP | 2008-281403 A | 11/2008 |
| JP | 2010014695 A | 1/2010 |

(Continued)

OTHER PUBLICATIONS

International Search Report dated Feb. 19, 2019 in corresponding application No. PCT/JP2018/043439; 5 pgs.

*Primary Examiner* — Tran M. Tran
(74) *Attorney, Agent, or Firm* — Maier & Maier, PLLC

(57) ABSTRACT

A multi-axial tactile sensor for detecting forces in directions of three axes and a moment about at least one axis includes at least four sensor elements including at least three shearing force detecting elements having beam structures provided with a first resistive layer and a second resistive layer at specific portions, and at least one pressing force detecting element having a beam structure provided with a third resistive layer and a fourth resistive layer at specific portions, the beam structures of the four sensor elements being (Continued)

arranged on a sensor substrate so that their respective longitudinal directions are radially arranged, and the moment about at least one axis is detected based on outputs of two or more sensor elements being arranged at positions of rotational symmetry around the center of the radial arrangement of the plurality of sensor elements.

10 Claims, 13 Drawing Sheets

(56) References Cited

U.S. PATENT DOCUMENTS

| | | | | |
|---|---|---|---|---|
| 5,083,466 | A * | 1/1992 | Holm-Kennedy | G01P 15/123 73/862.626 |
| 5,095,762 | A * | 3/1992 | Holm-Kennedy | G01P 15/0802 73/866.5 |
| 5,101,669 | A * | 4/1992 | Holm-Kennedy | G01P 15/0802 361/278 |
| 7,028,540 | B2 * | 4/2006 | Morikawa | G01L 5/162 73/146 |
| 7,367,232 | B2 * | 5/2008 | Vaganov | G01P 15/18 73/514.33 |
| 7,490,524 | B2 * | 2/2009 | Ohsato | G01L 5/162 73/862.629 |
| 7,509,869 | B2 * | 3/2009 | Liu | G01K 7/015 73/756 |
| 7,825,567 | B2 * | 11/2010 | Shimoyama | H01G 5/18 310/345 |
| 7,942,072 | B2 * | 5/2011 | Chang | G01L 5/162 73/862.041 |
| 8,359,931 | B2 * | 1/2013 | Nishiwaki | B66C 1/445 73/846 |
| 8,573,069 | B2 * | 11/2013 | Nishiwaki | B25J 13/083 73/862.471 |
| 8,640,553 | B2 * | 2/2014 | Barnett | G01L 5/20 73/862.045 |
| 9,310,265 | B2 * | 4/2016 | Shimoyama | G01L 5/228 |
| 9,504,417 | B2 * | 11/2016 | Shimoyama | A61C 19/04 |
| 10,234,429 | B2 * | 3/2019 | Shimoyama | H04R 23/02 |
| 10,571,347 | B2 * | 2/2020 | Baumann | G01L 1/18 |
| 10,634,695 | B2 * | 4/2020 | Yamaguchi | G01L 1/2268 |
| 11,137,248 | B2 * | 10/2021 | Kabasawa | G01P 15/123 |
| 11,137,299 | B2 * | 10/2021 | Abbasi Gavarti | H10N 30/03 |
| 11,237,077 | B2 * | 2/2022 | Smerzi | G01M 5/0041 |
| 11,448,506 | B2 * | 9/2022 | Komizo | H01L 21/30655 |
| 2006/0130595 | A1 * | 6/2006 | Meyer | G01D 5/183 73/862.041 |
| 2010/0175486 | A1 | 7/2010 | Chang et al. | |
| 2011/0121591 | A1 | 5/2011 | Nishiwaki | |
| 2011/0193363 | A1 * | 8/2011 | Nishiwaki | G01L 5/167 901/33 |
| 2012/0304778 | A1 * | 12/2012 | Nakamura | G01L 5/228 73/778 |
| 2014/0224037 | A1 | 8/2014 | Shimoyama et al. | |
| 2021/0404890 | A1 * | 12/2021 | Kosaka | G01L 1/2262 |
| 2022/0011184 | A1 | 1/2022 | Shimoyama et al. | |
| 2023/0124407 | A1 * | 4/2023 | Uhm | G01P 15/123 73/514.32 |
| 2023/0129177 | A1 * | 4/2023 | Mashiko | G01L 3/14 73/862.621 |

FOREIGN PATENT DOCUMENTS

| | | |
|---|---|---|
| JP | 2011-112459 A | 6/2011 |
| JP | 2013-068503 A | 4/2013 |
| JP | 5867688 B2 | 2/2016 |
| JP | 2017-187399 A | 10/2017 |
| JP | 6941901 B2 | 9/2021 |
| WO | 2018/179911 A1 | 10/2018 |

* cited by examiner

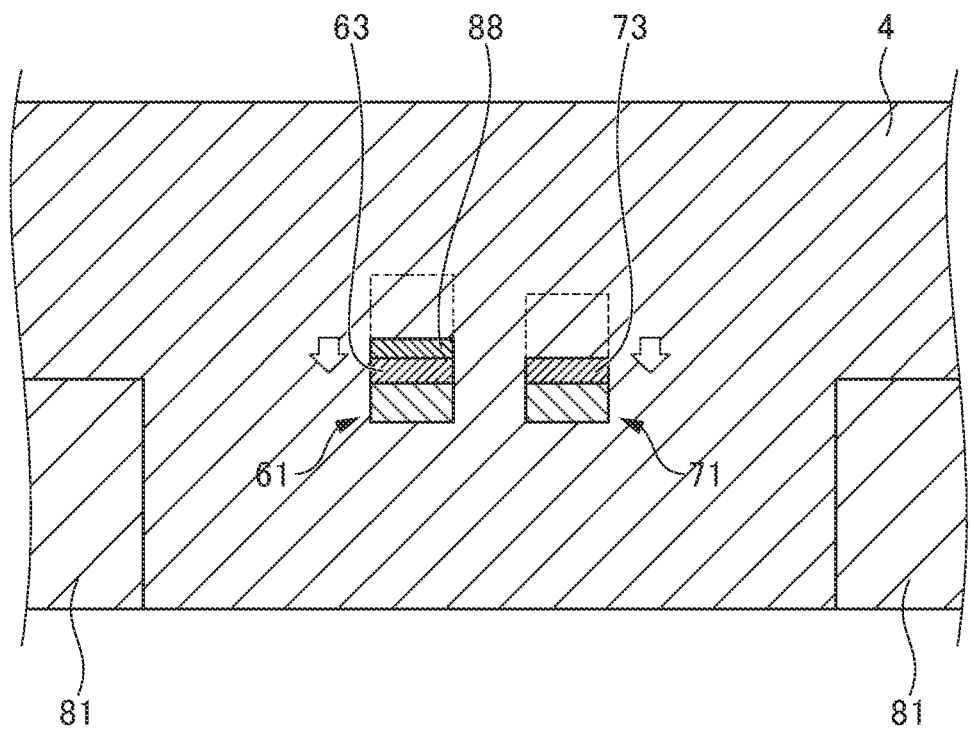

MULTI-AXIAL TACTILE SENSOR

TECHNICAL FIELD

The present invention relates to a multi-axial tactile sensor. More specifically, the present invention relates to a multi-axial tactile sensor for detecting force in directions of three axes and moment about at least one axis.

BACKGROUND

Multi-axial tactile sensors are known in the conventional art. Japanese Patent No. 5867688 discloses a tactile sensor in which a MEMS process is used to form a plurality of sensor elements substantially at the same level as the surface of the substrate. The tactile sensor described in Japanese Patent No. 5867688 is an extremely sophisticated tactile sensor, capable of detecting a shearing force with a thin structure. Japanese Patent No. 5867688 specifically discloses a tactile sensor that detects force in an X-axis direction and force in a Y-axis direction. However, in the fields of robotics and medicine, for example, in order to obtain detailed tactile information, there is a demand for tactile sensors with a plurality of detection axes, such as six-axis tactile sensors for measuring force in directions of three axes and moment about each axis. In addition, such tactile sensors are usually required to be small.

SUMMARY

As mentioned above, Japanese Patent No. 5867688 specifically discloses a configuration of detecting force in an X-axis direction and a Y-axis direction. It is also suggested that the invention may be configured to further measure moment, by providing three or more sensor elements and arranging the beams radially. However, Japanese Patent No. 5867688 does not describe, regarding a sensor in which the sensor elements are formed on a surface of the substrate, a specific configuration for detecting, in addition to force in the X-axis direction and force in the Y-axis direction, force in a Z-axis direction and moment about an axis. Therefore, in order to detect force in the Z-axis direction and moment about an axis in addition to force in the X-axis direction and Y-axis direction, one must additionally consider applications such as what kind of sensors to form on the surface of the substrate, and specifically in what kind of layout to arrange different kinds of sensors to enable detection with a high sensitivity.

The present invention was made in view of the above problem, and has an object of providing a multi-axial tactile sensor for detecting force in directions of three axes and moment about at least one axis, which is small and has high detection sensitivity.

(1) The present invention relates to a multi-axial tactile sensor for detecting forces in directions of three axes and moment about at least one axis of the three axes, including: a substrate; a plurality of sensor elements provided substantially at the same level as a surface of the substrate; and a transmission material covering around the plurality of sensor elements and transmitting external force to the plurality of sensor elements, wherein the plurality of sensor elements include: at least four sensor elements including at least three shearing force detecting elements having beam structures provided with resistive layers at specific portions to detect force in a direction parallel to the surface of the substrate; and at least one pressing force detecting element having a beam structure provided with resistive layers at specific portions to detect force in a direction perpendicular to the surface of the substrate, the beam structures of the four sensor elements being arranged on the substrate so that their respective longitudinal directions are radially arranged, and the moment about the at least one axis being detected based on outputs of two or more sensor elements being arranged at positions of rotational symmetry around a center of the radial arrangement of the plurality of sensor elements.

(2) The multi-axial tactile sensor according to (1) may be a multi-axial tactile sensor for detecting forces in directions of three axes and moments about the three axes, the plurality of sensor elements including: at least six sensor elements including at least three shearing force detecting elements having beam structures provided with resistive layers at specific portions to detect force in a direction parallel to the surface of the substrate; and at least three pressing force detecting elements having beam structures provided with resistive layers at specific portions to detect force in a direction perpendicular to the surface of the substrate, the beam structures of the six sensor elements being arranged on the substrate so that their respective longitudinal directions are radially arranged, and a moment about at least one axis of the moments about the three axes being detected based on outputs of two or more of the sensor elements being arranged at positions of rotational symmetry around a center of the radial arrangement of the plurality of sensor elements.

(3) In the multi-axial tactile sensor according to (2), the three pressing force detecting elements may be arranged at positions of three-fold symmetry around a center of the radial arrangement, and a moment about at least one axis of the moments about the three axes may be detected based on outputs of the three pressing force detecting elements being arranged at the positions of three-fold symmetry.

(4) The multi-axial tactile sensor according to may be a multi-axial tactile sensor for detecting forces in directions of three axes and moments about the three axes, the plurality of sensor elements including: at least eight sensor elements including at least four shearing force detecting elements having beam structures provided with resistive layers at specific portions to detect force in a direction parallel to the surface of the substrate; and at least four pressing force detecting elements having beam structures provided with resistive layers at specific portions to detect force in a direction perpendicular to the surface of the substrate, the beam structures of the eight sensor elements being arranged on the substrate so that their respective longitudinal directions are radially arranged, moments about at least two axes of the moments about the three axes being detected based on outputs of four or more of the pressing force detecting elements being arranged at positions of rotational symmetry around a center of the radial arrangement of the plurality of sensor elements, and the forces in the directions of the three axes being respectively detected based on outputs of two or more of the sensor elements being arranged at positions of rotational symmetry around the center of the radial arrangement of the plurality of sensor elements.

(5) In the multi-axial tactile sensor according to (4), the moments about the three axes may be respectively detected based on outputs of four of the sensor elements being arranged at positions of four-fold symmetry around a center of the radial arrangement of the plurality of sensor elements, and a force in a direction of at least one axis of the forces in the directions of the three axes may be detected based on outputs of four of the pressing force detecting elements being arranged at positions of four-fold symmetry around the center of the radial arrangement of the plurality of sensor elements.

(6) In the multi-axial tactile sensor according to (1) to (5), the beam structures of the plurality of sensor elements may be respectively constituted by two beams having both ends supported by the substrate, being parallel to each other, and being provided parallel to the substrate, the two beams being constituted by a first beam having a first detecting section having a first resistive layer formed on a surface that deforms by extending or contracting due to external force, and a second beam having a second detecting section having a second resistive layer formed on a surface that deforms by extending or contracting due to external force in an opposite manner to the first detecting section.

Effects of the Invention

With the present invention, it is possible to provide a multi-axial tactile sensor for detecting force in directions of three axes and moment about at least one axis, which is small and has high detection sensitivity.

BRIEF DESCRIPTION OF THE DRAWINGS

FIG. 10 shows a deformed state of two beams when a pressing force is applied to the pressing force detecting element;

DETAILED DESCRIPTION OF THE EMBODIMENTS

Figure 1:
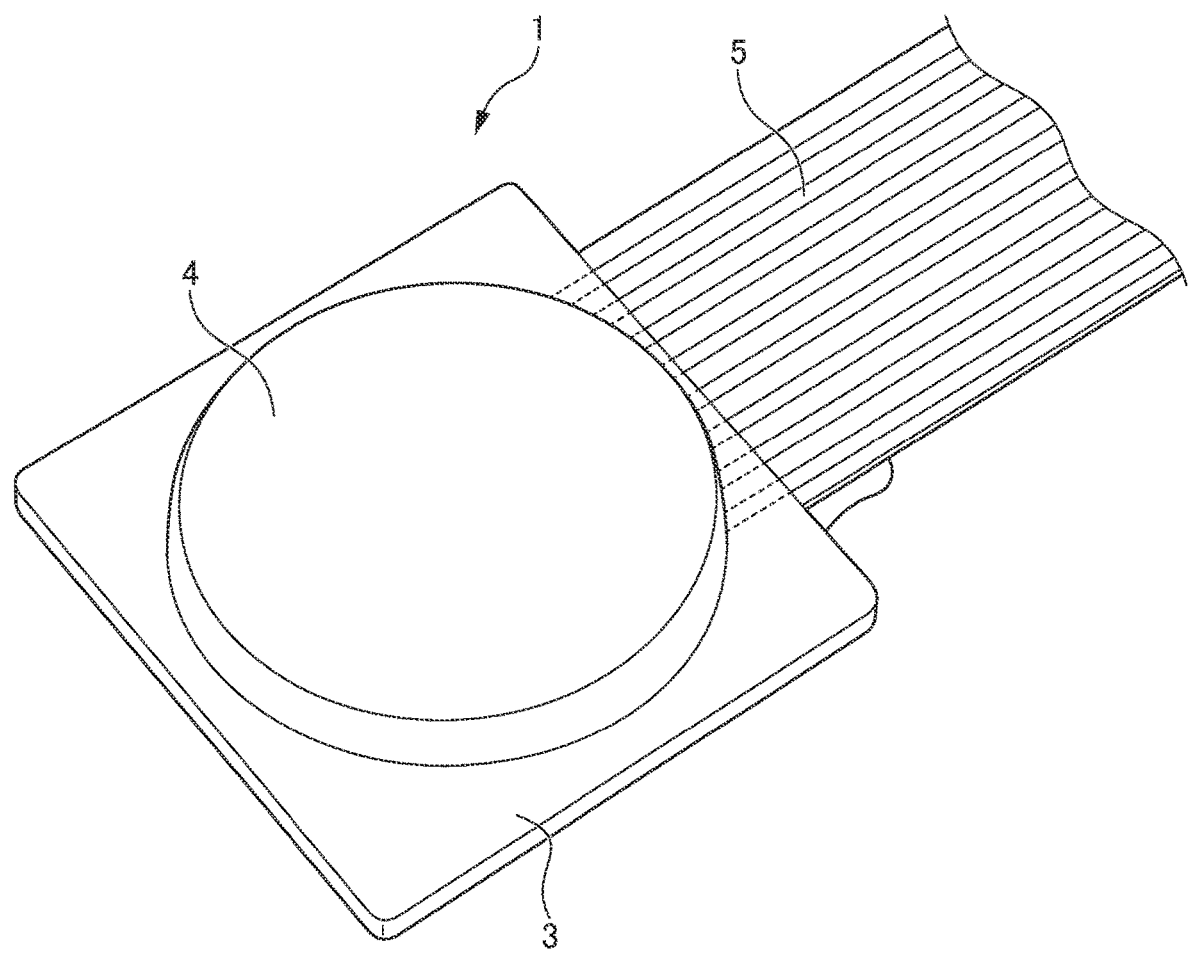
FIG. 1 is an external view of a multi-axial tactile sensor according to an embodiment of the present invention.

An embodiment of the present invention will be described in detail below with reference to the drawings. FIG. 1 is an external view of a multi-axial tactile sensor 1 according to an embodiment of the present invention.

The multi-axial tactile sensor 1 includes a base substrate 3 onto which a sensor substrate 2 (not shown in FIG. 1) described later is securely mounted. In addition, the sensor substrate 2 is covered by an elastic body 4. An external wire 5 is connected to the base substrate 3.

Figure 2:
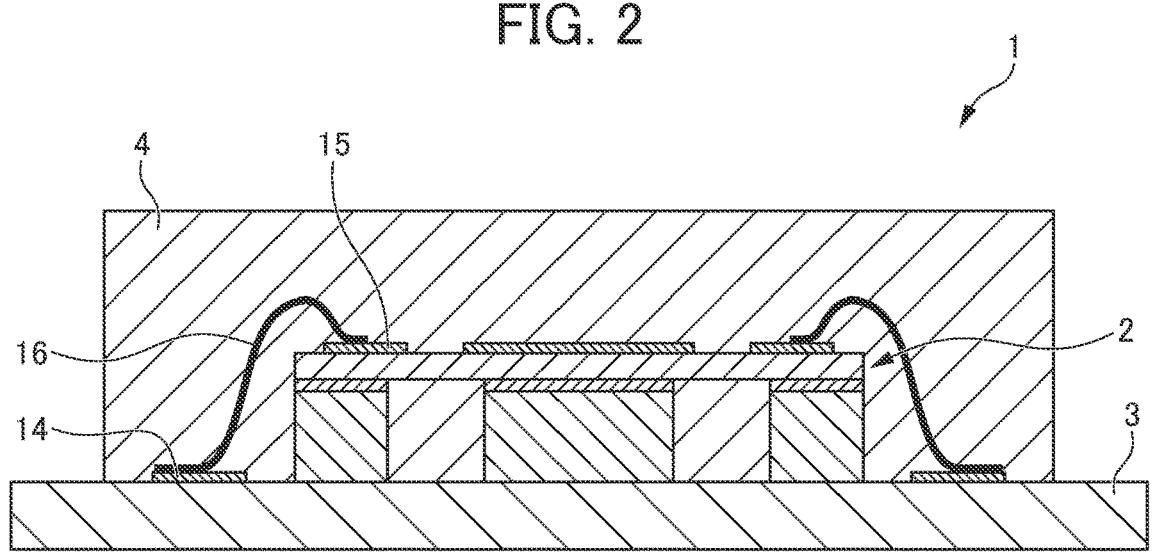
FIG. 2 schematically shows a cross-section of the multi-axial tactile sensor shown in FIG. 1.

FIG. 2 schematically shows a cross-section of the multi-axial tactile sensor 1 shown in FIG. 1. As shown in FIG. 2, the multi-axial tactile sensor 1 according to the present embodiment includes the base substrate 3 as a first substrate and the sensor substrate 2 as a second substrate placed on the base substrate 3. The base substrate 3 and the sensor substrate 2 are electrically connected by wire bonding. Specifically, a wire bonding 16 connects a pad 14 of the base substrate 3 and an electrode section 15 of the sensor substrate 2.

The sensor substrate 2 consists of a SOI substrate. Substantially at the same level as the surface of the sensor substrate 2, a plurality of sensor elements are formed by a MEMS process described later. The sensor substrate 2 on which a plurality of sensor elements are formed constitutes a sensor chip of the multi-axial tactile sensor 1.

The elastic body 4 is provided as a transmission material to cover around the plurality of sensor elements of the sensor substrate 2. The elastic body 4 has a function of transmitting external force to each sensor element. This elastic body 4 need only be able to be elastically deformed by an application of external force and elastically recover when the external force is removed, and various kinds of materials may be applied, for example, rubber (a thermoset elastomer), a thermoplastic elastomer, gel, etc. Further, at least with regards to the portion that directly covers the sensor substrate 2 and the wire bonding portion, a material with insulating properties is preferably used. In the present embodiment, silicone rubber is used as the elastic body 4. Silicone rubber has material properties such as low permanent compression set, versatile temperature characteristics, and insulating properties, which are preferable when applied to the multi-axial tactile sensor 1 of the present embodiment. Moreover, an outer package consisting of another material, for example, a hard outer package consisting of a hard material, may be provided further on the outside of the elastic body 4.

Figure 3:
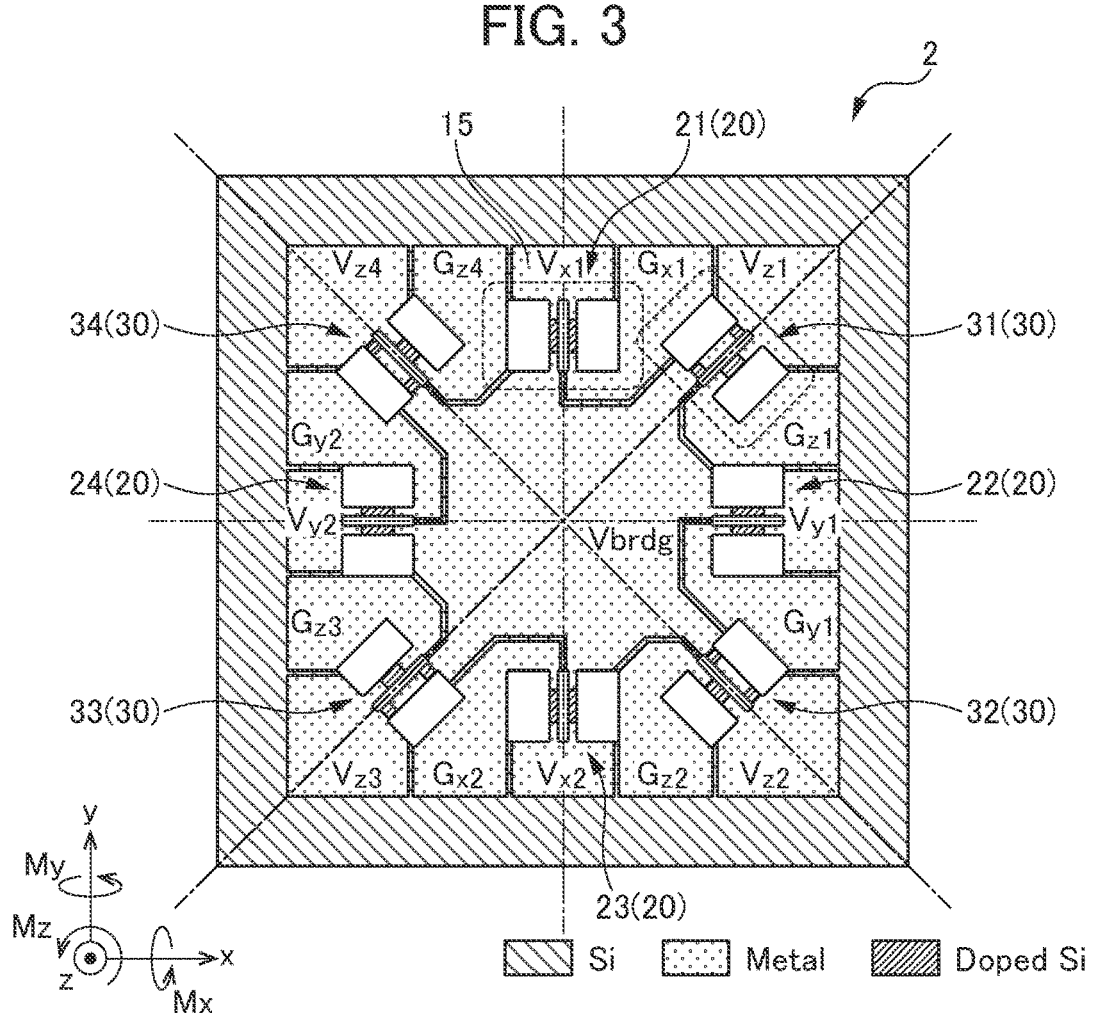
FIG. 3 is a top view of the sensor substrate shown in FIG. 2.

FIG. 3 shows a top view of the sensor substrate 2 shown in FIG. 2. On the surface of the sensor substrate 2, shearing force detecting elements 20 and pressing force detecting elements 30 are formed as the plurality of sensor elements. In the present embodiment, four shearing force detecting elements 21 to 24 are formed as the shearing force detecting elements 20. In addition, four pressing force detecting elements 31 to 34 are formed as the pressing force detecting elements 30.

The shearing force detecting elements 21 to 24 detect force in a direction parallel to the surface of the sensor substrate 2. More specifically, the shearing force detecting elements 21 and 23 detect force in the X-axis direction shown in FIG. 3. The shearing force detecting elements 22 and 24 detect force in the Y-axis direction shown in FIG. 3. Here, the direction toward the right side of the drawing of FIG. 3 is defined as the positive direction in the X-axis, and the direction toward the top of the drawing of FIG. 3 is defined as the positive direction in the Y-axis.

The pressing force detecting elements 31 to 34 detect force in a direction orthogonal to the surface of the sensor substrate 2. In other words, the pressing force detecting elements 31 to 34 detect force in the Z-axis direction shown in FIG. 3. Here, the direction perpendicular to the drawing of FIG. 3, in other words the direction in which the surface of the sensor substrate 2 is pressed, is defined as the negative direction. Each sensor element is composed of a piezoresistive sensor. Each sensor element has a beam structure including a piezoresistive layer at a specific portion.

Here, the multi-axial tactile sensor 1 of the present embodiment is configured so that the longitudinal directions of the beam structures of the plurality of sensor elements are radially arranged. This will be described in further detail later.

Figure 4:
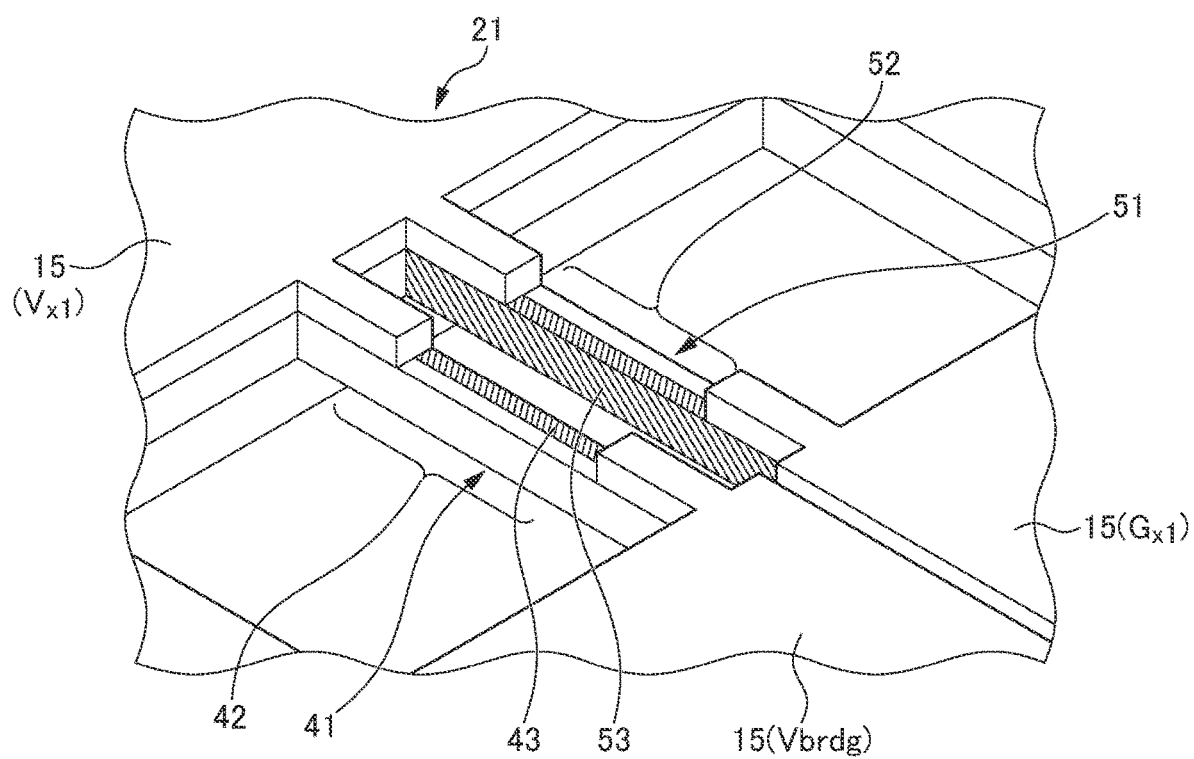
FIG. 4 is a perspective view schematically showing a configuration of a shearing force detecting element.
Figure 5A:
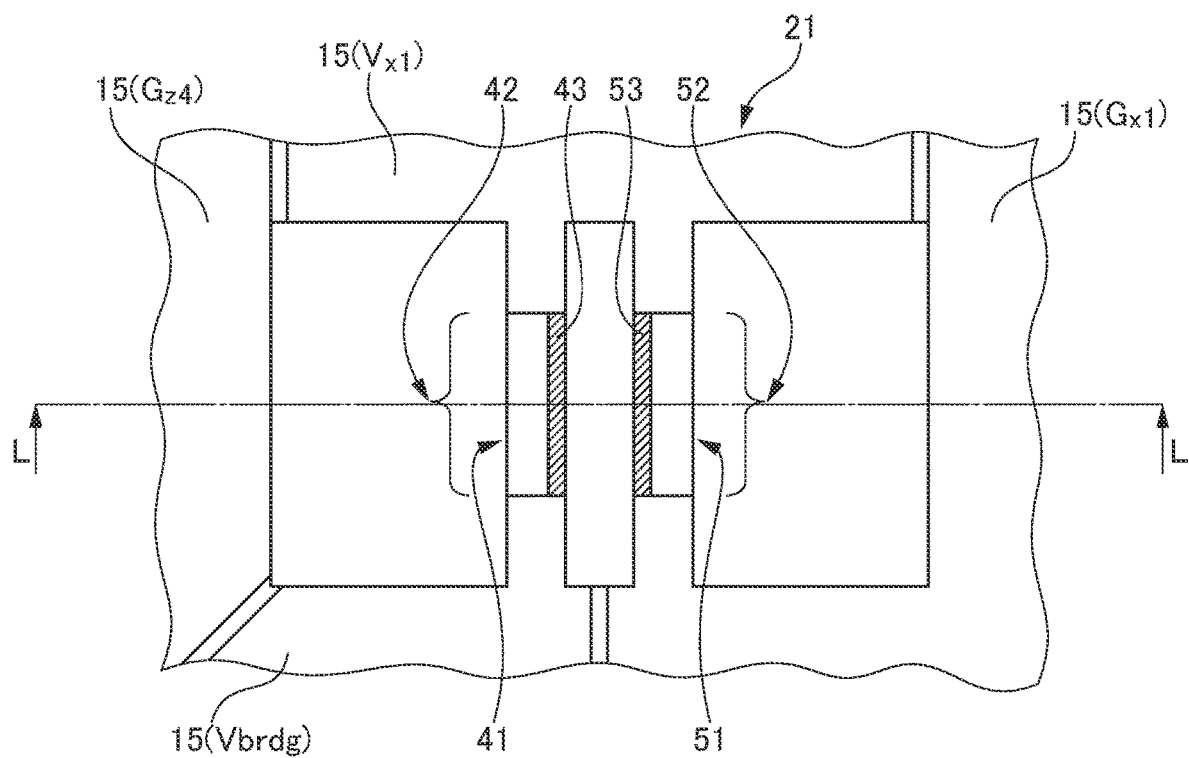
FIG. 5A is a schematic view as seen from above the shearing force detecting element of FIG. 4.
Figure 5B:
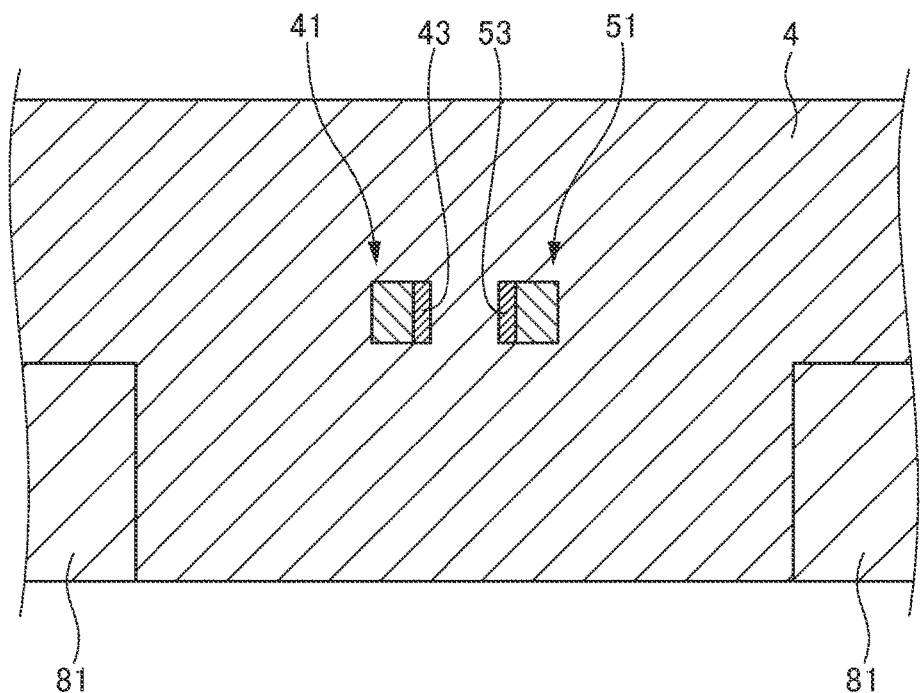
FIG. 5B is a cross-sectional view showing a cross-section taken along line L-L in FIG. 5A.

FIG. 4 is a perspective view schematically showing the configuration of the shearing force detecting element 21. FIG. 5A is a schematic view as seen from above the shearing force detecting element 21 of FIG. 4. FIG. 5B is a cross-sectional view showing a cross-section taken along line L-L in FIG. 5A. In FIG. 4 and FIG. 5A, the elastic body 4 covering the edges of the beam structure and the periphery of the sensor element is omitted.

Here, the shearing force detecting elements 21 to 24 all have the same structure. Therefore, the structure of the shearing force detecting element 21 will be described as a representative thereof. The shearing force detecting element 21 includes two beams 41 and 51 as the beam structure. The two beams 41 and 51 are doubly-supported beams of which both ends are supported, and are arranged substantially parallel to each other and substantially parallel to the surface of the sensor substrate 2. The first beam 41 has a first detecting section 42 as a section that deforms by extending or contracting due to external force in the X-axis direction, on which a first resistive layer 43 is formed. The second beam 51 has a second detecting section 52 as a section that deforms by contracting or extending in the opposite manner to the first resistive layer 43 due to an external force in the X-axis direction, on which a second resistive layer 53 is formed. In the present embodiment, as shown in FIGS. 4 to 5, the first resistive layer 43 and the second resistive layer 53 are respectively provided on the surfaces of the first beam 41 and the second beam 51 facing each other, in other words, the opposing surfaces. It should be noted that since the vicinity of the ends of the two beams 41 and 51 are covered by an electrode section 15 as a conductive layer, these portions constitute inactive parts of the piezoresistive sensor. Therefore, in FIG. 5A, the portions that are not covered by the electrode section 15 as a conductive layer, in other words the portions of the first resistive layer 43 and the second resistive layer 53 which can be visually confirmed in FIG. 5A, constitute the first detecting section 42 and the second detecting section 52.

Figure 6A:
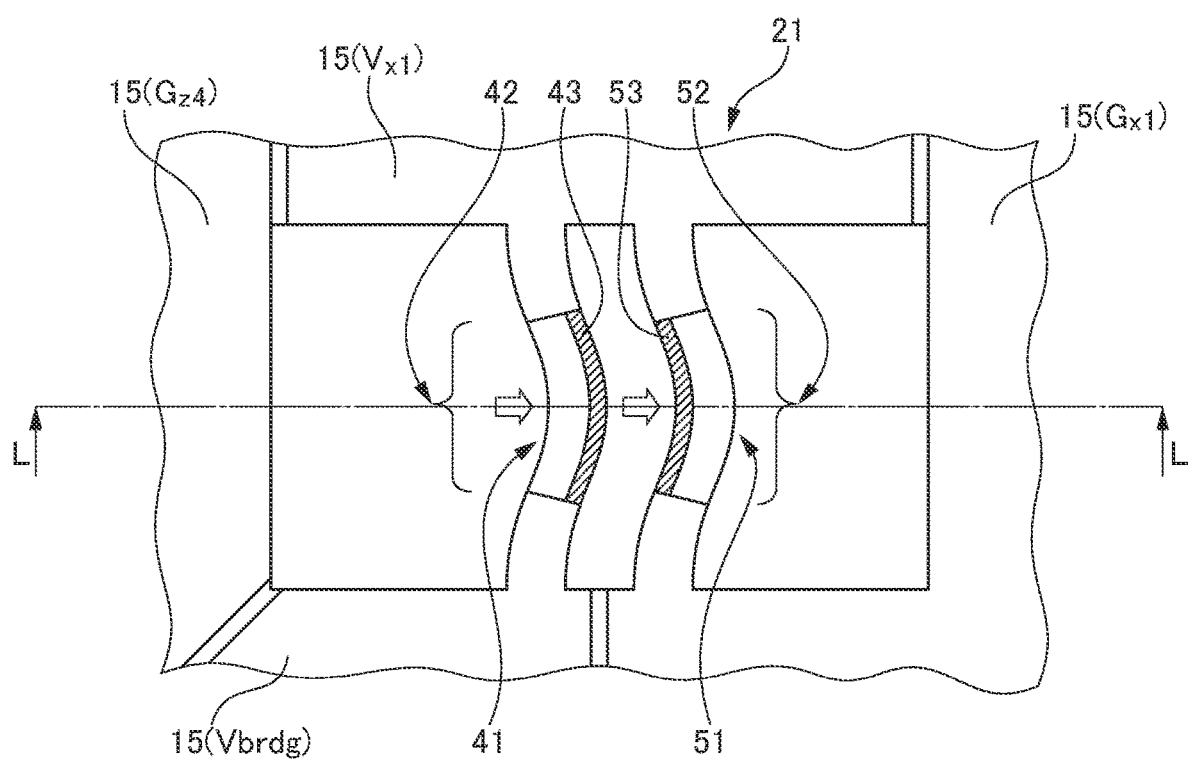
FIG. 6A shows a deformed state of two beams when an external force in an X-axis direction is applied to the shearing force detecting element.
Figure 6B:
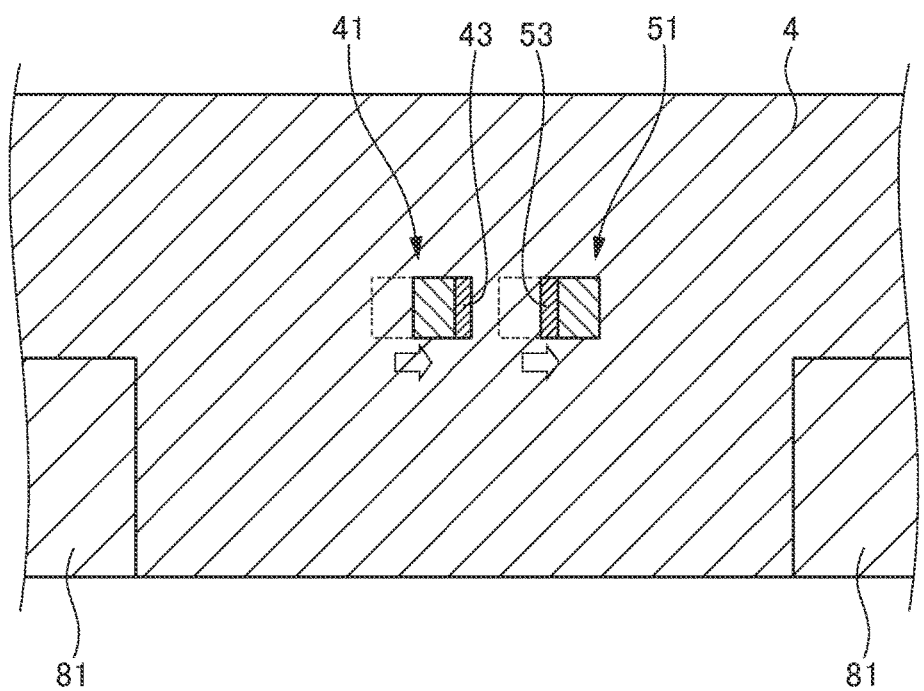
FIG. 6B is a cross-sectional view showing a cross-section taken along line L-L in FIG. 6A.
Figure 7:
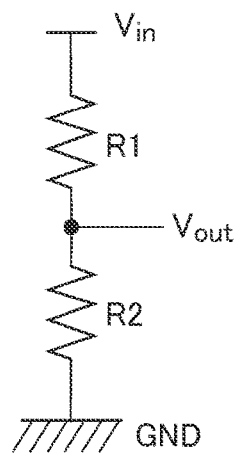
FIG. 7 is a circuit diagram showing a measuring circuit that detects shearing force based on deformation of two beams.

Here, the operating principle of the shearing force detecting element 21 will be described. FIG. 6A shows a view corresponding to FIG. 5A, and illustrates a deformed state of the two beams when external force in the X-axis direction is applied to the shearing force detecting element 21. FIG. 6B is a cross-sectional view showing a cross-section taken along line L-L in FIG. 6A. FIG. 7 is a circuit diagram showing a measuring circuit that detects shearing force based on the deformation of the two beams.

As shown in FIGS. 5A and 5B, when no external force is applied to the elastic body 4 of the multi-axial tactile sensor 1, the first beam 41 and the second beam 51 constituting the beam structure maintain a linear shape. Conversely, when force in the X-axis direction is applied to the elastic body 4, the first beam 41 and the second beam 51 covered by the elastic body bend in such a manner that the central portions of the beams move in the X-axis direction, as shown in FIG. 6A and FIG. 6B. That is to say, the first detecting section 42 of the first beam 41 deforms in a direction that causes the surface on which the first resistive layer 43 is provided to extend. On the other hand, the second detecting section 52 of the second beam 51 deforms in a direction that causes the surface on which the second resistive layer 53 is provided to contract. In this way, the first detecting section 42 and the second detecting section 52 extend and contract as a pair.

Since the first beam 41 provided with the first detecting section 42 and the second beam 51 provided with the second detecting section 52 have substantially the same mechanical properties, the amount of deformation of each beam relative to a given external force is substantially the same. Therefore, the amount of change in resistance value of the first resistivity layer 43 of the first detecting section 42 and the amount of change in resistance value of the second resistivity layer 53 of the second detecting section 52 become opposite positive and negative values having the same absolute value.

Such changes in resistance values in accordance with an external force are measured by the bridge circuit shown in FIG. 7. First, as shown in FIG. 5A and FIG. 5B, in a state when no external force is applied to the elastic body 4 of the multi-axial tactile sensor 1, a resistance value R1 of the first detecting section 42 of the first beam 41 and a resistance value R2 of the second detecting section 52 of the second beam 51 are equal. In other words, this is a state in which R1=R2=R. If an input voltage Vin=V is applied in this state, the output voltage Vout will equal V/2.

Conversely, when external force in the X-axis direction is applied to the elastic body 4 as shown in FIG. 6A and FIG. 6B, the resistance value R1 of the first detecting section 42 of the first beam 41 and the resistance value R2 of the second detecting section 52 of the second beam 51 change by the same value in the opposite positive and negative directions. In other words, R1=R+ΔR, and R2=R−ΔR. As a result, the output voltage Vout when the input voltage Vin=V is applied changes by ΔR*V/2R as compared to when no external force is applied. In other words, ΔV=ΔR*V/2R is obtained as a voltage change amount. Based on this voltage change amount ΔV, it is possible to detect a shearing force in the X-axis direction according to the state of deformation of the beam structure.

By employing a method of measuring resistance values that change in the opposite positive and negative directions using the two beams 41 and 51, it is possible to effectively cancel out variations in resistance values due to changes in temperature and interference from other axes.

The shearing force detecting element 23 can also obtain the voltage change amount ΔV by the same operating principle. In addition, although the shearing force detecting elements 22 and 24 which detect force in the Y-axis direction are arranged so that the longitudinal directions of their beam structures are perpendicular to the Y-axis direction, the operating principle is the same as for the shearing force detecting elements 21 and 23 which detect force in the X-axis direction.

Here, the shearing force detecting element 21 is set to output a positive value of the voltage change amount ΔV when force is applied in the positive X-axis direction. The shearing force detecting element 22 is set to output a positive value of the voltage change amount ΔV when force is applied in the negative Y-axis direction. The shearing force detecting element 23 is set to output a positive value of the voltage change amount ΔV when force is applied in the negative X-axis direction. The shearing force detecting element 24 is set to output a positive value of the voltage change amount ΔV when force is applied in the positive Y-axis direction.

Figure 8:
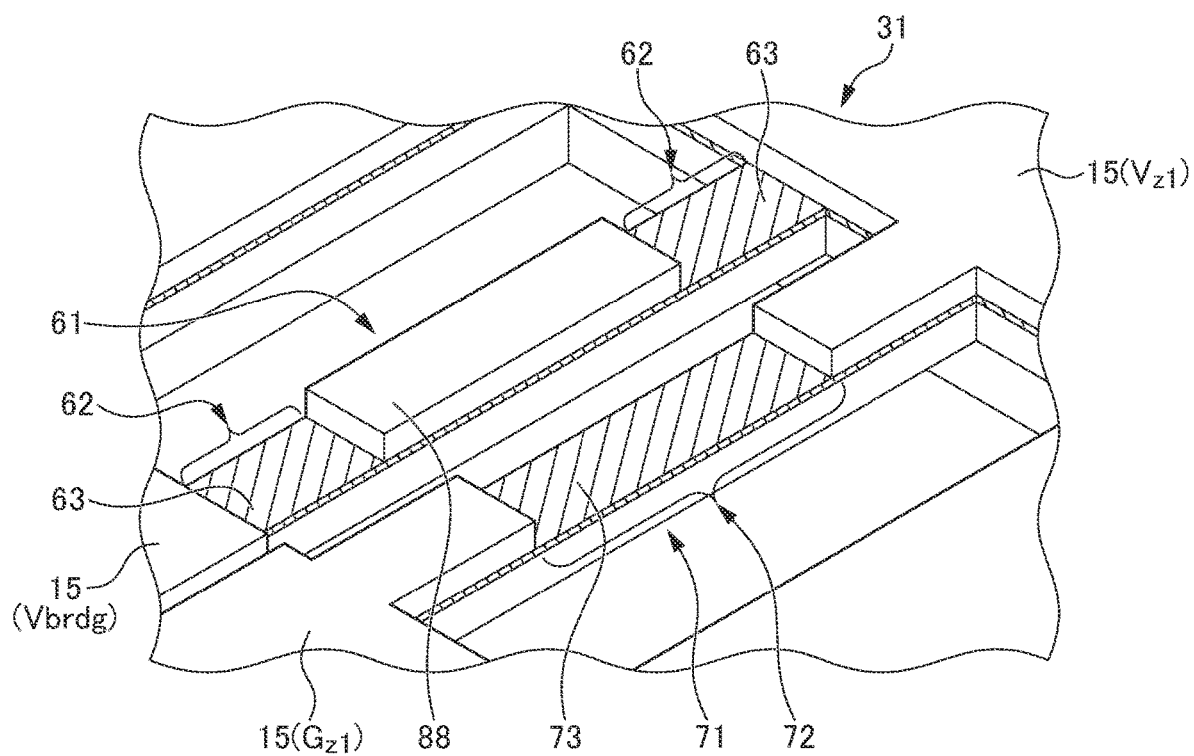
FIG. 8 is a perspective view schematically showing a configuration of a pressing force detecting element.
Figure 9A:
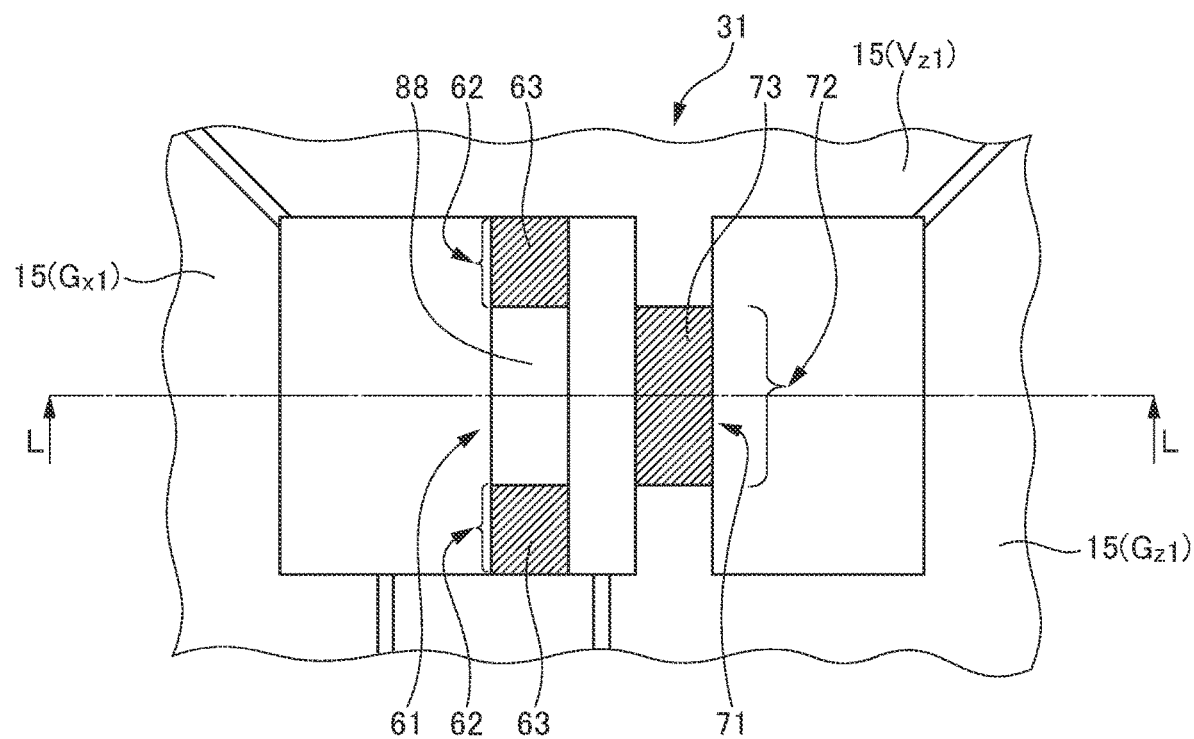
FIG. 9A is a schematic view as seen from above the pressing force detecting element of FIG. 8.
Figure 9B:
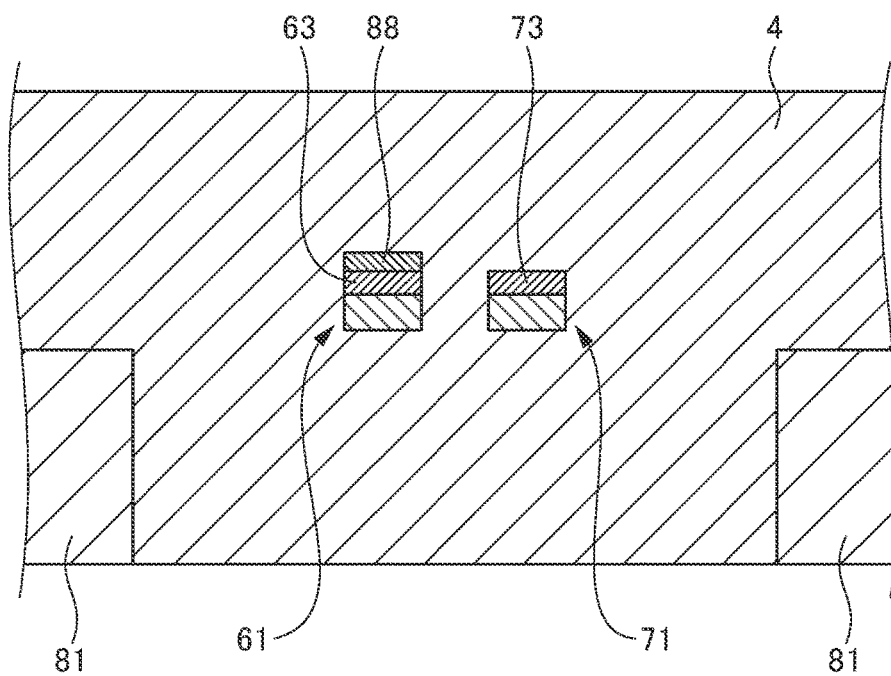
FIG. 9B is a cross-sectional view showing a cross-section taken along line L-L in FIG. 9A.

Next, the pressing force detecting elements 30 (31 to 34) will be described. FIG. 8 is a perspective view schematically showing the configuration of the pressing force detecting element 31. FIG. 9A is a schematic view as seen from above the pressing force detecting element 31 of FIG. 8 FIG. 9B is a cross-sectional view showing a cross-section taken along line L-L in FIG. 9A. In FIG. 8 and FIG. 9A, the elastic body 4 covering the edges of the beam structure and the periphery of the sensor element is omitted.

Here, the pressing force detecting elements 31 to 34 all have the same structure. Therefore, the structure of the pressing force detecting element 31 will be described as a representative thereof. The pressing force detecting element 31 includes two beams 61 and 71 as the beam structure. The two beams 61 and 71 are doubly-supported beams of which both ends are supported, and are arranged substantially parallel to each other and substantially parallel to the surface of the sensor substrate 2. The third beam 61 has a third detecting section 62 as a section that deforms by extending or contracting due to external force in the Z-axis direction, on which a third resistive layer 63 is formed. The fourth beam 71 has a fourth detecting section 72 as a section that deforms by contracting or extending in the opposite manner to the third resistive layer 63 due to an external force in the Z-axis direction, on which a fourth resistive layer 73 is formed. In the present embodiment, as shown in FIG. 8 and FIG. 9B, the third and fourth resistive layers 63 and 73 are provided along the entirety of the third and fourth beams 61 and 71. However, at an intermediate region of the third beam 61, an inactive part-forming conductive layer 88 is coated as a conductive layer. In addition, the vicinity of the ends of the fourth beam 71 are covered by an electrode section 15 as a conductive layer. Therefore, the portions covered by these conductive layers constitute inactive parts of the piezoresistive sensor. As such, the third detecting section 62 of the third beam 61 is the region in the vicinity of the ends of the third beam 61, and the fourth detecting section 72 of the fourth beam 71 is the central region of the fourth beam 71. That is to say, in FIG. 9A, the portions of the beams that are not covered by the inactive part-forming conductive layer 88 and the electrode section 15 as conductive layers, in other words the portions of the beams where the third resistive layer 63 and the fourth resistive layer 73 can be visually confirmed in FIG. 9A, constitute the third detecting section 62 and the fourth detecting section 72.

Here, the operating principle of the pressing force detecting element 31 will be described. FIG. 10 shows a view corresponding to FIG. 9B, and illustrates a deformed state of the two beams when a pressing force is applied to the pressing force detecting element 31.

When a pressing force is applied to the pressing force detecting element 31, the third beam 61 and the fourth beam 71 bend in such a manner that the central portions of the beams move in the pressing direction. This causes the third detecting section 62 provided to the region in the vicinity of the ends of the third beam 61 to deform in a direction that causes the surface on which the third resistive layer 63 is provided to extend, and the fourth detecting section 72 provided to the central region of the fourth beam 71 to deform in a direction that causes the surface on which the fourth resistive layer 73 is provided to contract. In other words, the third detecting section 62 and the fourth detecting section 72 extend and contract as a pair.

The amount of change in resistance value of the third resistivity layer 63 of the third detecting section 62 and the amount of change in resistance value of the fourth resistivity layer 73 of the fourth detecting section 72 are designed to become opposite positive and negative values having the same absolute value when a given external force is applied. Therefore, with the pressing force detecting element 31, like with the shearing force detecting element 21, a voltage change amount ΔV for detecting a pressing force in the Z-axis direction can be obtained by using the bridge circuit as shown in FIG. 7.

Here, the pressing force detecting elements 31 to 34 are set to output a positive value of the voltage change amount ΔV when force is applied in the positive Z-axis direction. In other words, they are set to output a negative value of the voltage change amount ΔV when force is applied in the pressing direction, that is to say the negative Z-axis direction.

Returning now to FIG. 3, an electrode pattern of the sensor substrate 2 for configuring the aforementioned bridge circuit will be described. As shown in FIG. 3, the electrode section 15 of the sensor substrate 2 is divided into a plurality of regions. Specifically, 17 electrode regions are formed, indicated as Vbrdg, Vx1, Vx2, Vy1, Vy2, Vz1, Vz2, Vz3, Vz4, Gx1, Gx2, Gy1, Gy2, Gz1, Gz2, Gz3, and Gz4. Here, in order to detect, for example, a voltage change amount ΔVx1 for detecting shearing force in the X-axis direction applied to the shearing force detecting element 21, the bridge circuit is configured using Vbrdg, Vx1, and Gx1 as the electrode section for the input voltage Vin, the electrode section for the output voltage Vout, and the electrode section for the GND. Similarly, for all eight sensor elements, the bridge circuit is configured using the following electrode sections as the electrode section for the input voltage Vin, the electrode section for the output voltage Vout, and the electrode section for the GND. It should be noted that Vbrdg is a shared electrode section for the input voltage Vin.

(1) Electrode sections for the shearing force detecting element 21 (for detecting ΔVx1): Vbrdg, Vx1, Gx1 (2) Electrode sections for the shearing force detecting element 22 (for detecting ΔVy1): Vbrdg, Vy1, Gy1 (3) Electrode sections for the shearing force detecting element 23 (for detecting ΔVx2): Vbrdg, Vx2, Gx2 (4) Electrode sections for the shearing force detecting element 24 (for detecting ΔVy2): Vbrdg, Vy2, Gy2 (5) Electrode sections for the pressing force detecting element 31 (for detecting ΔVz1): Vbrdg, Vz1, Gz1 (6) Electrode sections for the pressing force detecting element 32 (for detecting ΔVz2): Vbrdg, Vz2, Gz2 (7) Electrode sections for the pressing force detecting element 33 (for detecting ΔVz3): Vbrdg, Vz3, Gz3 (8) Electrode sections for the pressing force detecting element 34 (for detecting ΔVz4): Vbrdg, Vz4, Gz4

The sensor substrate 2 of the multi-axial tactile sensor 1 according to the present embodiment is produced by a known MEMS process as described, for example, in Patent Document 1. Forming of the piezoresistive layers and conductive layers (electrode sections), and forming of the beam structures, is done by, for example, performing processes such as etching, impurity doping, and film forming on a SOI substrate. This forms a plurality of sensor elements substantially at the same level as the surface of the sensor substrate 2.

After forming the plurality of sensor elements on the sensor substrate 2 by the MEMS process, the sensor substrate 2 is placed on the base substrate 3. Then, after connecting the sensor substrate 2 and the base substrate 3 by the wire bonding 16, the sensor substrate 2 is covered by the elastic body 4. At this time, the elastic body 4 also fills openings and the surroundings of the beams of the sensor substrate 2 formed by the MEMS process. It should be noted that filling of the openings and surroundings of the beams of the sensor substrate 2 with the elastic body 4 may be done before placing the sensor substrate 2 on the base substrate 3.

Using the aforementioned MEMS process makes it possible to form the multi-axial tactile sensor 1 that is capable of detecting force in a direction parallel to and force in a direction orthogonal to the surface of the sensor substrate 2, and is further capable of detecting moment about an axis as described below, with a relatively simple process.

Next, using FIG. 11, things that should be considered regarding a multi-axial tactile sensor in which a plurality of sensor elements are formed on the surface of the sensor substrate will be explained.

When configuring a multi-axial tactile sensor using the MEMS process mentioned above, a plurality of sensor elements must be arranged on one substrate. If, for example, the sensor elements that detect shearing force in the X-axis direction and Y-axis direction are arranged in any layout at this time, interference from other axial directions will occur.

Figure 11:
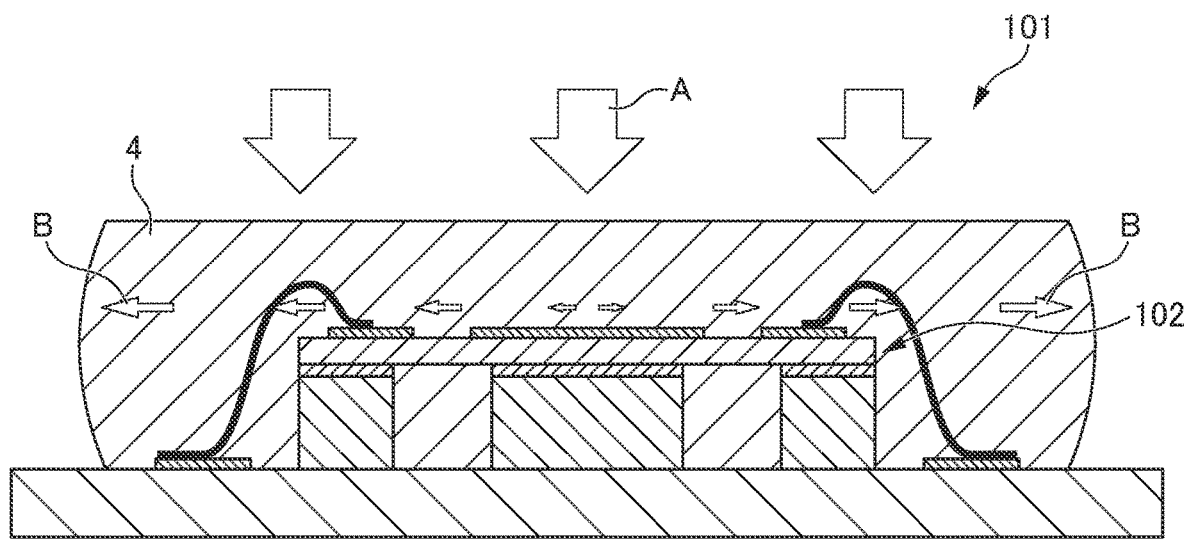
FIG. 11 is a drawing for explaining things that should be considered regarding a multi-axial tactile sensor in which a plurality of sensor elements are formed on a surface of the sensor substrate.

For example, as shown in FIG. 11, when force in the Z-axis direction indicated by the arrow A is applied to a multi-axial tactile sensor 101, the elastic body 4 is compressed in the thickness direction. Here, the rubber or elastomer used as the elastic body 4 is normally a non-compressible material. For example, silicone rubber is a non-compressible material with a Poisson's ratio of about 0.5. Therefore, when the elastic body 4 is compressed in the thickness direction, the elastic body 4 will expand in the direction indicated by the arrow B, that is to say in a direction parallel to the surface of the sensor substrate 102. The radial shearing force generated by this expansion distorts the beams constituting the sensor elements, and thus causes interference from other axial directions. If the outputs of a plurality of shearing force detecting elements arranged in any layout and in which such interference from other axial directions has occurred are combined without any consideration to compute moment about, for example, the Z-axis, the computed moment value will not be precise.

Even with hardware in which the influence of interference from other axial directions is great as mentioned above, it is possible to ship a sensor with a certain degree of precision by calibrating the interference from other axial directions at the shipping stage. However, in a case where the influence of interference from other axial directions is great in the initial state and significant calibrations are made at the shipping stage, the amount of deviation may gradually increase due to deterioration over time of the components constituting the sensor, causing precision to decrease. Therefore, the hardware is preferably configured to generate as little interference from other axial directions as possible.

Through specific and diligent research, the present invention realizes a configuration of a multi-axial tactile sensor that is small and has high detection sensitivity, capable of detecting force in directions of three axes and moment about at least one axis.

Specifically, the multi-axial tactile sensor 1 according to the present embodiment has the shearing force detecting elements 20 and the pressing force detecting elements 30 arranged so that the longitudinal directions of the respective beam structures of the shearing force detecting elements 20 and the pressing force detecting elements 30 are radially arranged, and further uses the outputs of the shearing force detecting elements 20 and the pressing force detecting elements 30 which are in a specific positional relationship to detect force in the directions of the axes and moment about the axis. Therefore, since the longitudinal directions of the beam structures are radially arranged, the problem of interference from other axial directions mentioned above is less likely to occur, and further, since the outputs of the shearing force detecting elements 20 and the pressing force detecting elements 30 in a specific positional relationship are used to detect force in the directions of the axes and moment about the axis, detection sensitivity is high.

Thus, the multi-axial tactile sensor 1 according to the present embodiment, as shown in the preferred example and the first to third modified examples described below, is a sensor for detecting force in at least the three directions of the X-axis, the Y-axis, and the Z-axis, and moment about at least one axis of the three axes, in which a plurality of sensor elements are formed on the surface of the sensor substrate 2. The plurality of sensor elements includes at least four sensor elements, including at least three shearing force detecting elements 20 having beam structures provided with resistive layers for detecting force in a direction parallel to the surface of the sensor substrate 2, in other words force in the X-axis direction and the Y-axis direction, and at least one pressing force detecting element 30 having a beam structure provided with a resistive layer for detecting force in a direction perpendicular to the surface of the sensor substrate 2, in other words force in the Z-axis direction, the respective beam structures of these at least four sensor elements being arranged on the sensor substrate 2 so that their respective longitudinal directions are radially arranged. Further, of the three axes, moment about at least one axis is detected based on the outputs of two or more sensor elements out of the plurality of sensor elements, the two or more sensor elements being arranged at positions of rotational symmetry around the center of the radial arrangement described above. This configuration makes it possible to realize a small multi-axial tactile sensor capable of detecting force in directions of three axes and moment about at least one axis of the three axes.

Figure 12:
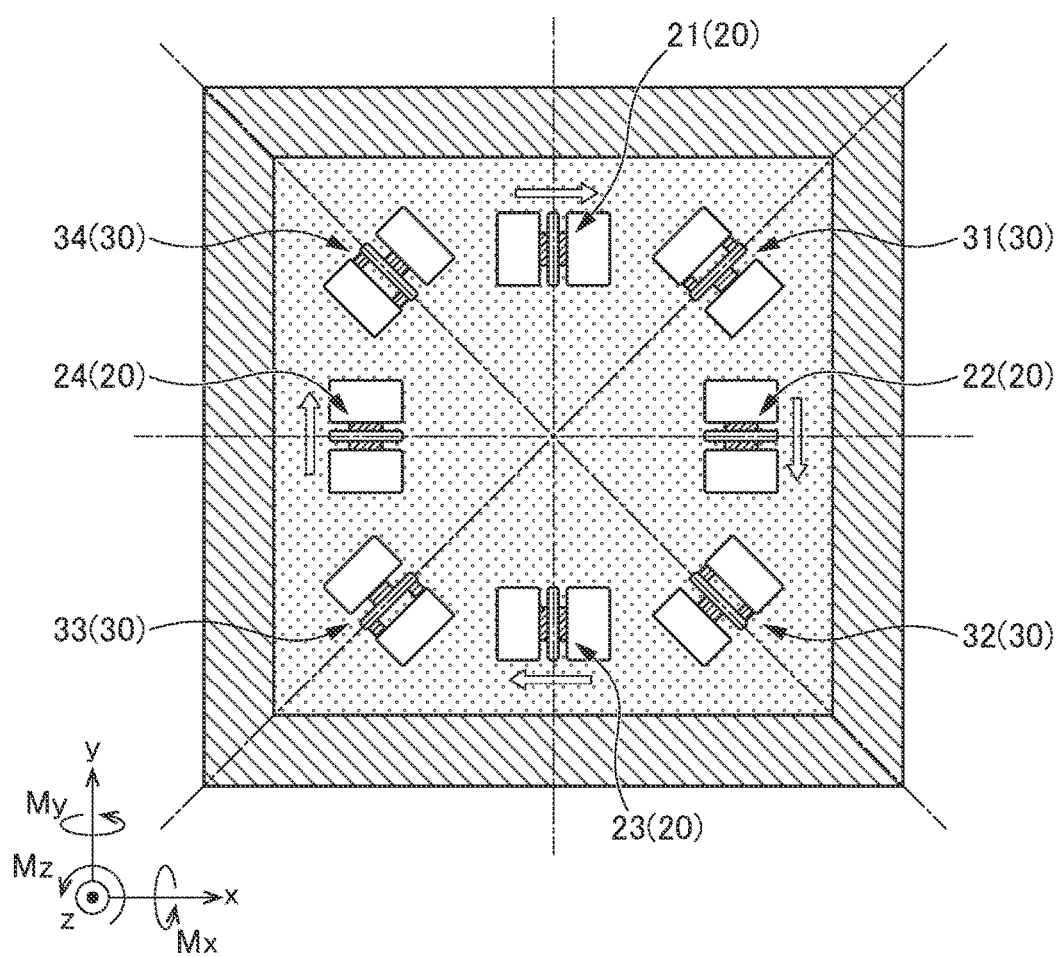
FIG. 12 shows a preferred example arrangement of sensor elements.

FIG. 12 shows a preferred example arrangement of sensor elements in the multi-axial tactile sensor 1 according to the present embodiment. Note that illustration of the electrode pattern is omitted. In this example, four shearing force detecting elements 20 (21, 22, 23, 24) and four pressing force detecting elements 30 (31, 32, 33, 34) are formed on the sensor substrate 2 as the plurality of sensor elements. These eight sensor elements are arranged on the sensor substrate 2 so that the longitudinal directions of the beam structures of the respective sensor elements are radially arranged. Here, in case the beam structure of each sensor element is formed by two beams, as in the shearing force detecting elements 20 and pressing force detecting elements 30 according to the present embodiment, the sensor elements are arranged on the sensor substrate 2 so that the center line of the beam structure consisting of two beams constituting one sensor element is radially arranged.

And, as shown in FIG. 12, the four shearing force detecting elements 21, 22, 23, and 24 are arranged in a rotationally symmetrical relationship. In this example, the shearing force detecting elements 21, 22, 23, and 24 are arranged in four-fold symmetry with the approximate central position of the sensor substrate 2 as the reference axis, in other words, in a state where they would overlap each other if rotated 90 degrees about the reference axis. In addition, the four pressing force detecting elements 31, 32, 33, and 34 are also arranged in a rotationally symmetrical relationship. In this example, the pressing force detecting elements 31, 32, 33, and 34 are arranged in four-fold symmetry with the approximate central position of the sensor substrate 2 as the reference axis, in other words, in a state where they would overlap each other if rotated 90 degrees about the reference axis. More specifically, the four shearing force detecting elements 21, 22, 23, and 24 and the four pressing force detecting elements 31, 32, 33, and 34 are alternately arranged at 45-degree intervals.

Employing this kind of configuration enables detection of a force Fx, Fy, and Fr in the X-axis, Y-axis, or Z-axis directions, and a moment Mx, My, and Mz about the X-axis, Y-axis, or Z-axis. Specifically, it is possible to detect the force Fx in the X-axis direction based on the outputs of the shearing force detecting elements 21 and 23, the force Fy in the Y-axis direction based on the outputs of the shearing force detecting elements 22 and 24, the force Fz in the Z-axis direction based on the outputs of the pressing force detecting elements 31, 32, 33, and 34, the moment Mx about the X-axis based on the outputs of the pressing force detecting elements 31, 32, 33, and 34, the moment My about the Y-axis based on the outputs of the pressing force detecting elements 31, 32, 33, and 34, and the moment Mz about the Z-axis based on the outputs of the shearing force detecting elements 21, 22, 23, and 24.

More specifically, the forces Fx, Fy, and Fz in the X-axis, Y-axis, and Z-axis directions, and the moments Mx, My, and Mz about the X-axis, Y-axis, and Z-axis are calculated based on voltage outputs VFx, VFy, VFz, VMx, VMy, and VMz obtained from the following formulas (1) to (6). Here, $\Delta V$ is a voltage change amount detected by the aforementioned bridge circuit when an external force is applied to each sensor element. That is to say, the voltage change amounts $\Delta Vx1$, $\Delta Vy1$, $\Delta Vx2$, and $\Delta Vy2$ are respectively the voltage change amounts detected by the bridge circuit as outputs of the shearing force detecting elements 21, 22, 23, and 24, and the voltage change amounts $\Delta Vz1$, $\Delta Vz2$, $\Delta Vz3$, $\Delta Vz4$ are respectively the voltage change amounts detected by the bridge circuit as outputs of the pressing force detecting elements 31, 32, 33, and 34.

$$VFx = (\Delta Vx1 - \Delta Vx2)/2 \tag{1}$$

$$VFy = (\Delta Vy1 - \Delta Vy2)/2 \tag{2}$$

$$VFz = (\Delta Vz1 + \Delta Vz2 + \Delta Vz3 + \Delta Vz4)/4 \tag{3}$$

$$VMx = (\Delta Vz1 + \Delta Vz4 - \Delta Vz2 - \Delta Vz3)/4 \tag{4}$$

$$VMy = (\Delta Vz3 + \Delta Vz4 - \Delta Vz1 - \Delta Vz2)/4 \tag{5}$$

$$VMz = -(\Delta Vx1 + \Delta Vx2 + \Delta Vy1 + \Delta Vy2)/4 \tag{6}$$

In this way, out of the three moments Mx, My, and Mz, at least the two moments Mx and My are detected based on the outputs of four sensor elements arranged at positions of rotational symmetry (four-fold symmetry) around the center of the radial arrangement of the plurality of sensor elements, and thus moment is detected with extremely high sensitivity. In addition, the moment Mz is also detected based on the outputs ($\Delta Vx1$, $\Delta Vy1$, $\Delta Vx2$, $\Delta Vy2$) of four sensor elements (shearing force detecting elements 21, 22, 23, 24) arranged at positions of rotational symmetry (four-fold symmetry) around the center of the radial arrangement of the plurality of sensor elements, and thus moment is detected with extremely high sensitivity. Alternatively, Mz may be detected based on the outputs ($\Delta Vx1$ and $\Delta Vx2$, or $\Delta Vy1$ and $\Delta Vy2$) of two sensor elements (a pair of shearing force detecting elements 21, 23, or a pair of shearing force detecting elements 22, 24) arranged at positions of rotational symmetry (two-fold symmetry) around the center of the radial arrangement of the plurality of sensor elements. In this case, although the sensitivity is slightly lower compared to detection based on outputs of four sensor elements, it is still possible to detect moment with high sensitivity, since sensor elements arranged at positions of rotational symmetry are used.

In addition, the forces Fx, Fy, and Fz in directions of three axes are respectively detected based on the outputs of two or more sensor elements arranged at positions of rotational symmetry (two-fold symmetry) around the center of the radial arrangement of the plurality of sensor elements, and thus force in a direction of an axis is detected with extremely high sensitivity. Further, by detecting the pressing force Fz based on the outputs of four sensor elements (pressing force detecting elements 31, 32, 33, 34) arranged at positions of rotational symmetry (four-fold symmetry) around the center of the radial arrangement of the plurality of sensor elements, and thus the force in a direction of an axis can be detected with even higher sensitivity. The above Fx, Fy, Fr, Mx, My, and Mz are respectively obtained with the voltage outputs VFx, VFy, VFz, VMx, VMy, and VMz as the main components. Further, in the calibration process, the values of Fx, Fy, Fz, Mx, My, and Mz may be compensated taking voltage outputs other than the main components into account.

In this way, by arranging the sensor elements in a specific layout so that the longitudinal directions of the beam structures of the sensor elements are radially arranged, and by further combining the outputs of a plurality of sensor elements which are in a rotationally symmetrical relationship to minimize the influence of interference from other axial directions, it is possible to provide a multi-axial tactile sensor which is capable of detecting force in the X-axis direction, the Y-axis direction, and the Z-axis direction, and moment about the X-axis, the Y-axis, and the Z-axis, with high sensitivity.

In other words, the multi-axial tactile sensor 1 according to the present embodiment shown in FIG. 12 can detect a force Fx, Fy, and Fz in the three X-axis, Y-axis, or Z-axis directions, and a moment Mx, My, and Mz about the three axes. The surface of the sensor substrate 2 is provided with at least eight sensor elements including at least four shearing force detecting elements 21, 22, 23, and 24, and at least four pressing force detecting elements 31, 32, 33, and 34, the respective beam structures of the eight sensor elements being arranged on the sensor substrate 2 so that their longitudinal directions are radially arranged. Further, of the moments Mx, My, and Mz about the three axes, the moments Mx and My about at least two axes are detected based on the outputs of four pressing force detecting elements 31, 32, 33, and 34 arranged at positions of rotational symmetry around the center of the radial arrangement of the plurality of sensor elements. Alternatively, each of the forces Fx, Fy, and Fz in directions of three axes is detected based on the outputs of two or more sensor elements arranged at positions of rotational symmetry around the center of the radial arrangement of the plurality of sensor elements. Further, as described above, the moment Mz may also be detected based on the outputs of the four shearing force detecting elements 21, 22, 23, and 24 arranged at positions of rotational symmetry around the center of the radial arrangement of the plurality of sensor elements, so that the moment is detected with extremely high sensitivity. Further, as described above, the pressing force Fz may be detected based on the outputs of the four pressing force detecting elements 31, 32, 33, and 34 arranged at positions of rotational symmetry around the center of the radial arrangement of the plurality of sensor elements, so that the force in a direction of an axis is detected with extremely high sensitivity. This makes it possible to provide a multi-axial tactile sensor that is small and has high detection sensitivity, capable of detecting force in directions of three axes and moment about three axes.

First Modified Example

Figure 13:
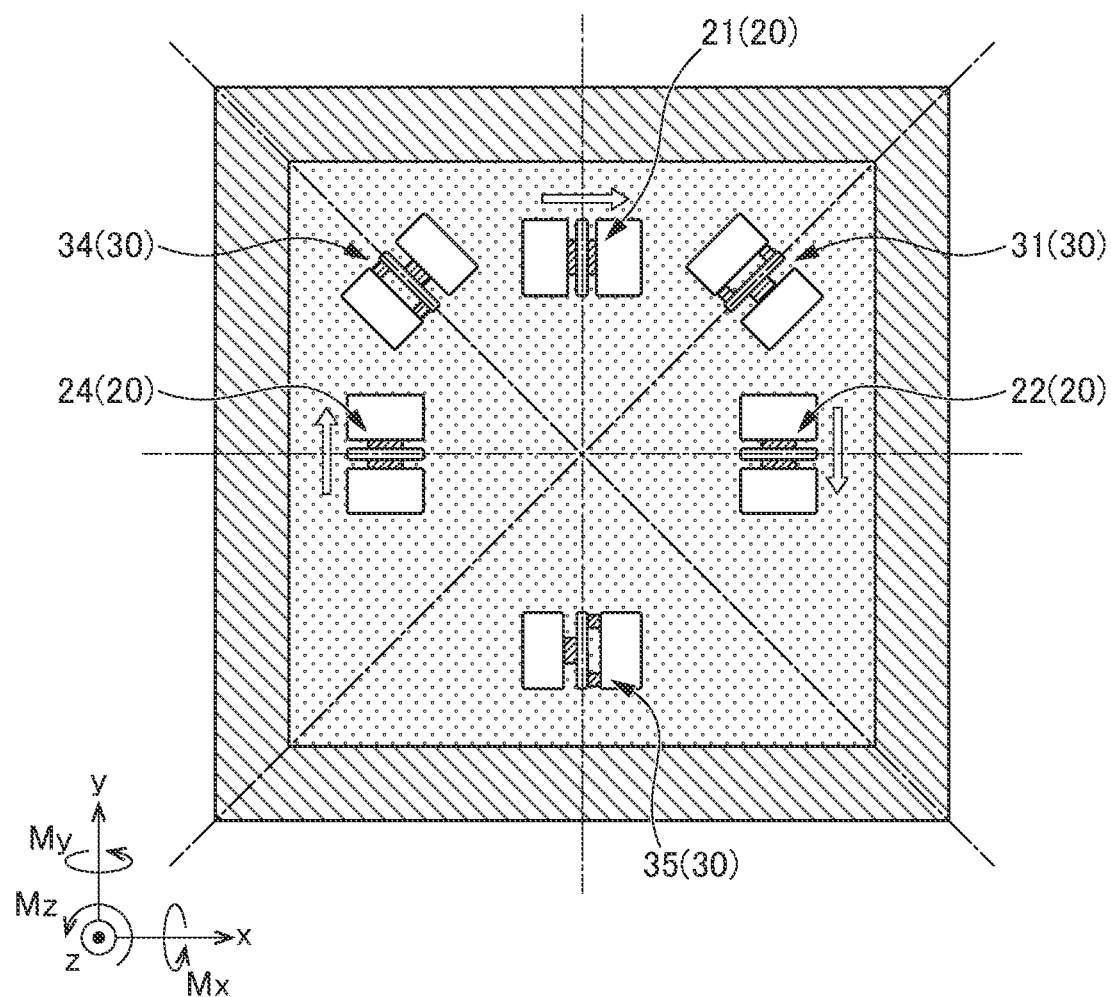
FIG. 13 shows a first modified example showing another example arrangement of sensor elements.

FIG. 13 shows a first modified example showing another example arrangement of the sensor elements. Note that illustration of the electrode pattern is omitted. In this example, three shearing force detecting elements 21, 22, and 24, and three pressing force detecting elements 31, 35, and 34, are formed as a plurality of sensor elements on the sensor substrate 2. These six sensor elements are arranged on the sensor substrate 2 so that the longitudinal direction of the beam structure of each sensor element is radially arranged.

As shown in FIG. 13, the shearing force detecting elements 21, 22, and 24 are arranged in the same positions as the shearing force detecting elements 21, 22, and 24 in FIG. 12. Additionally, at least two shearing force detecting elements 22 and 24 are arranged in a rotationally symmetrical relationship. In other words, the shearing force detecting elements 20 are arranged in two-fold symmetry with the approximate central position of the sensor substrate 2 as the reference axis, that is to say, in a state where they would overlap each other if rotated 180 degrees about the reference axis. Of the three pressing force detecting elements, the two pressing force detecting elements 31 and 34 are arranged at the same positions as the pressing force detecting elements 31 and 34 in FIG. 12. The pressing force detecting element 35 is provided at the position where the shearing force detecting element 23 is provided in the example shown in FIG. 12.

Employing this configuration enables detection of the forces Fx, Fy, and Fz in the X-axis, Y-axis, and Z-axis directions, and the moments Mx, My, and Mz about the X-axis, Y-axis, and Z-axis. Specifically, it is possible to detect the force Fx in the X-axis direction based on the output of the shearing force detecting element 21, the force Fy in the Y-axis direction based on the outputs of the shearing force detecting elements 22 and 24, the force Fz in the Z-axis direction based on the outputs of the pressing force detecting elements 31, 35, and 34, the moment Mx about the X-axis based on the outputs of the pressing force detecting elements 31, 35, and 34, the moment My about the Y-axis based on the outputs of the pressing force detecting elements 31 and 34, and the moment Mz about the Z-axis based on the outputs of the shearing force detecting elements 22 and 24.

It should be noted that detecting the voltage change amounts ΔV from the bridge circuit corresponding to the sensor elements, obtaining the voltage outputs VF and VM by combining the voltage change amounts ΔV, and obtaining the forces F in the directions of the axes and the moments M about the axes based on the voltage outputs VF and VM is done by the same method as described above, and further description is therefore omitted. Regarding the voltage output VMx for obtaining the moment about the X-axis, the resistance values of the pressing force detecting elements 31, 35, and 34 may be respectively detected, and the moment may be detected based on a combination of the average value of the outputs of the pressing force detecting elements 31 and 34 and the output of the pressing force detecting element 35. In other words, the moment Mx about the X-axis may be detected based on the positions and the outputs of the three pressing force detecting elements 31, 35, and 34.

As described above, according to the first modified example, the multi-axial tactile sensor 1 can detect a force Fx, Fy, and Fr in the three X-axis, Y-axis, or Z-axis directions, and a moment Mx, My, and Mz about the three axes. The surface of the sensor substrate 2 is provided with at least six sensor elements including at least three shearing force detecting elements 21, 22, and 24, and at least three pressing force detecting elements 31, 35, and 34, the respective beam structures of the six sensor elements being arranged on the sensor substrate 2 so that their longitudinal directions are radially arranged. Further, of the three axes, the moment Mz about at least one axis is detected based on the outputs of two sensor elements 22 and 24 arranged at positions of rotational symmetry around the center of the radial arrangement of the plurality of sensor elements. This makes it possible to provide a multi-axial tactile sensor that is small and has high detection sensitivity, capable of detecting force in directions of three axes and moment about three axes. At this time, detection sensitivity is particularly high with respect to the force Fy in the Y-axis direction and the moment Mz about the Z-axis, which are detected by the outputs of the sensor elements arranged at positions of rotational symmetry.

It should be noted that the three pressing force detecting elements 31, 35, and 34 in the present modified example may be arranged in a rotationally symmetrical relationship around the center of the radial arrangement and the position of the pressing force detecting element 35. For example, the pressing force detecting elements 31, 35, and 34 may be arranged in three-fold symmetry with the approximate central position of the sensor substrate 2 as the reference axis, that is to say, in a state where they would overlap each other if rotated 120 degrees around the reference axis. Specifically, with the center of the radial arrangement and the position of the pressing force detecting element 35 as the reference position (maintaining the position of the pressing force detecting element 35 as shown in FIG. 13), the pressing force detecting element 31 is arranged at a position 120 degrees counter-clockwise from the position at which the pressing force detecting element 35 is arranged, and the pressing force detecting element 34 is arranged at a position 120 degrees clockwise from the position at which the pressing force detecting element 35 is arranged. In this case, the force Fz in the Z-axis direction is detected based on the outputs of the three pressing force detecting elements 31, 35, and 34 arranged at positions of rotational symmetry around the center of the radial arrangement. In addition, the moment Mx about the X-axis is detected based on the positions and the outputs of the three pressing force detecting elements 31, 35, and 34 arranged at positions of rotational symmetry around the center of the radial arrangement. In this way, by arranging the three pressing force detecting elements 31, 35, and 34 in three-fold symmetry in good balance relative to the center of the radial arrangement, it is possible to obtain the force Fz in the Z-axis direction and the moment Mx about the X-axis with high sensitivity.

Second Modified Example

Figure 14:
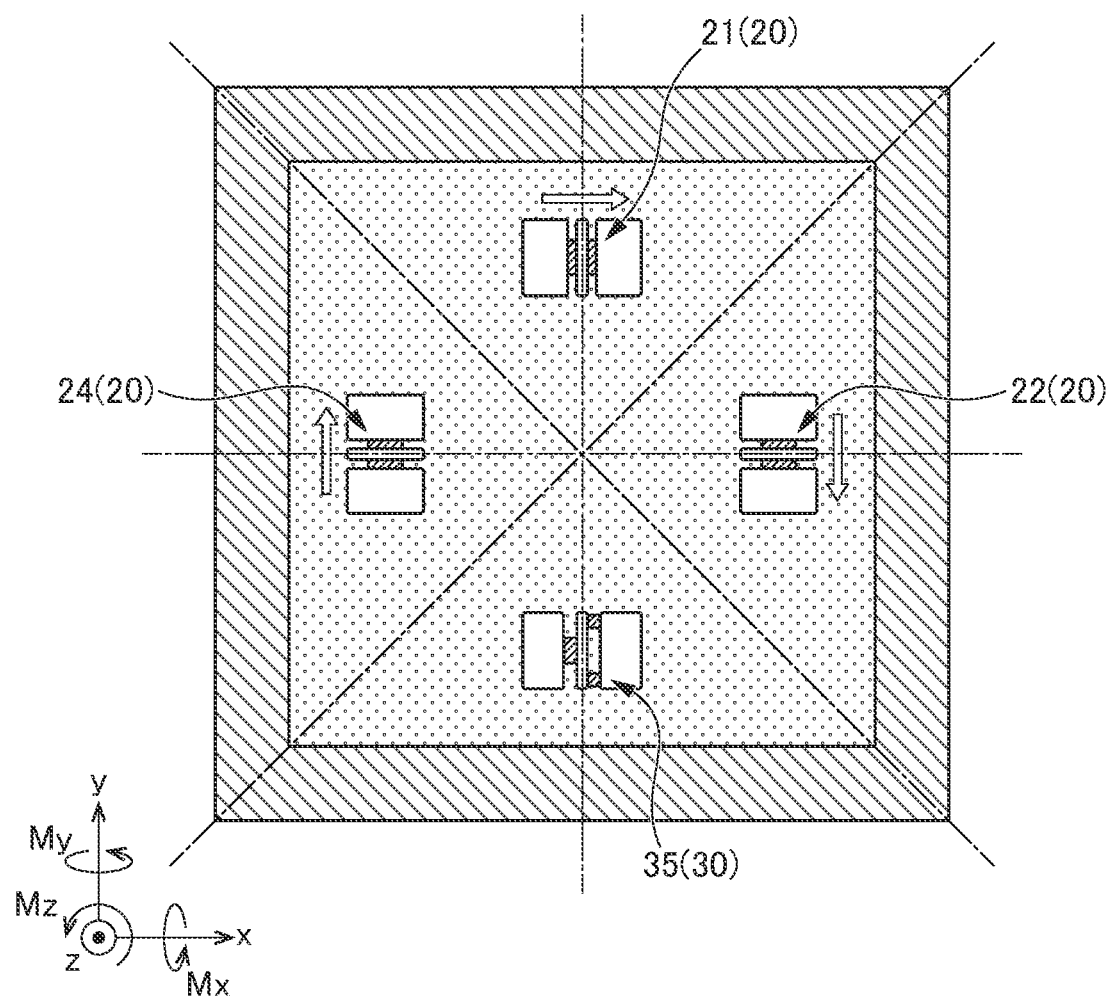
FIG. 14 shows a second modified example regarding an arrangement of a plurality of sensor elements.

FIG. 14 shows a second modified example regarding an arrangement of the plurality of sensor elements. In this modified example, compared to the first modified example shown in FIG. 13, the pressing force detecting elements 31 and 34 are not provided. Even with such a configuration, it is possible to detect the forces Fx, Fy, and Fz in the X-axis, Y-axis, and Z-axis directions, and the moment Mz about the Z-axis. Specifically, it is possible to detect the force Fx in the X-axis direction based on the output of the shearing force detecting element 21, the force Fy in the Y-axis direction based on the outputs of the shearing force detecting elements 22 and 24, the force Fz in the Z-axis direction based on the output of the pressing force detecting element 35, and the moment Mz about the Z-axis based on the outputs of the shearing force detecting elements 22 and 24.

As described above, according to the second modified example, the multi-axial tactile sensor 1 can detect a force Fx, Fy, and Fz in the three X-axis, Y-axis, or Z-axis directions, and a moment Mz about one of the three axes. The surface of the sensor substrate 2 is provided with four sensor elements including three shearing force detecting elements 21, 22, and 24, and one pressing force detecting element 35, the respective beam structures of the four sensor elements being arranged on the sensor substrate 2 so that their longitudinal directions are radially arranged. Further, of the three axes, the moment Mz about at least one axis is detected based on the outputs of two sensor elements 22 and 24 arranged at positions of rotational symmetry around the center of the radial arrangement of the plurality of sensor elements. This makes it possible to provide a multi-axial tactile sensor that is small and has high detection sensitivity, capable of detecting force in directions of three axes and moment about one axis. At this time, detection sensitivity is particularly high with respect to the force Fy in the Y-axis direction and the moment Mz about the Z-axis, which are detected by the outputs of the sensor elements arranged at positions of rotational symmetry.

Third Modified Example

Figure 15:
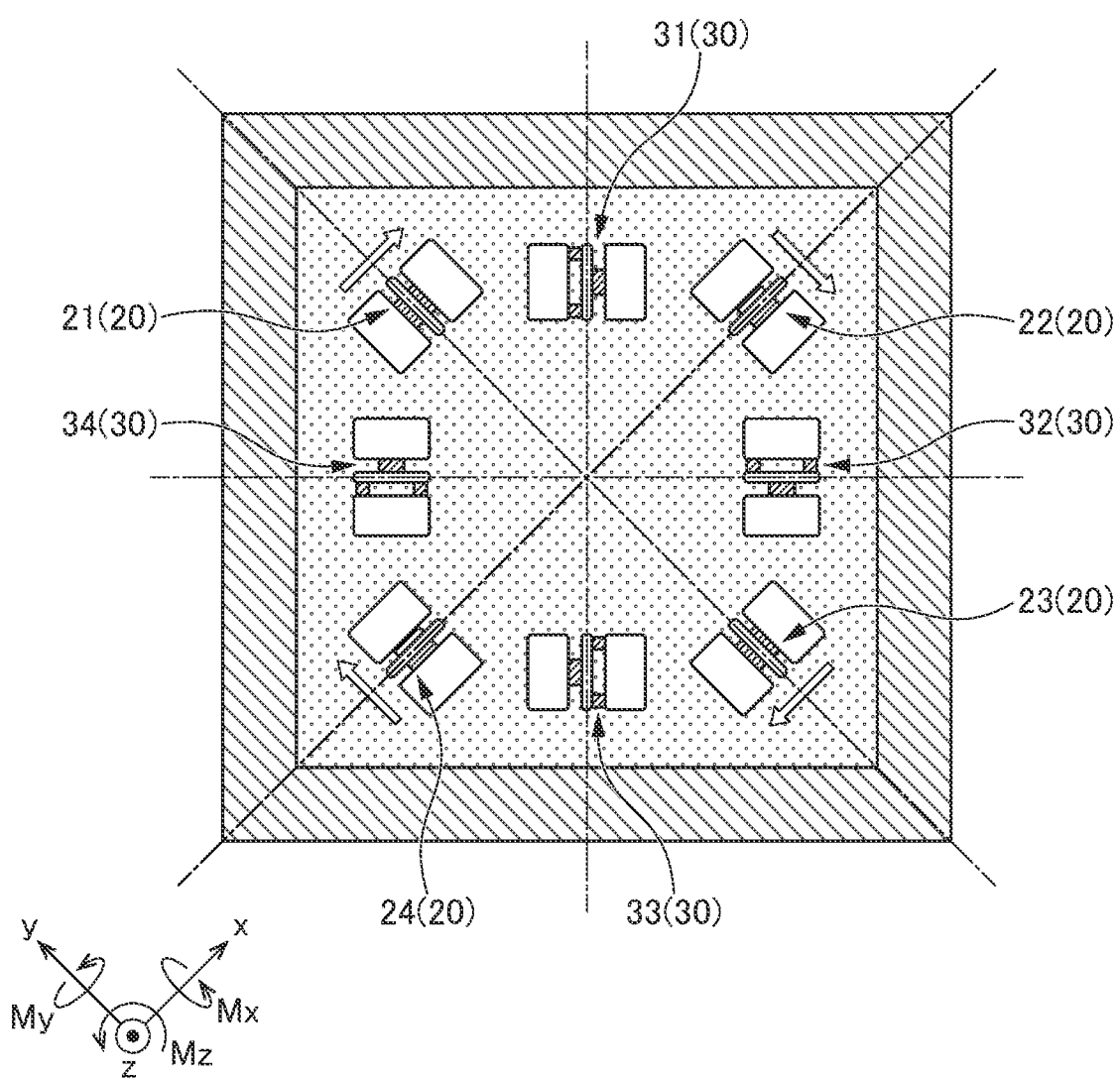
FIG. 15 shows a third modified example regarding an arrangement of a plurality of sensor elements.

FIG. 15 shows a third modified example regarding arrangement of the plurality of sensor elements. In this modified example, compared to the embodiment shown in FIG. 12, the shearing force detecting elements 21, 22, 23, and 24, and the pressing force detecting elements 31, 32, 33, and 34 are all arranged at positions rotated 45 degrees in the counter-clockwise direction. Even in this case, although the relationship between the directions of the sensor substrate 2 and the X-axis and Y-axis directions is different, it is basically possible to obtain the forces Fx, Fy, and Fz in directions of three axes and the moments Mx, My, and Mz about three axes by the same method as in the embodiment shown in FIG. 12.

Figure 16:
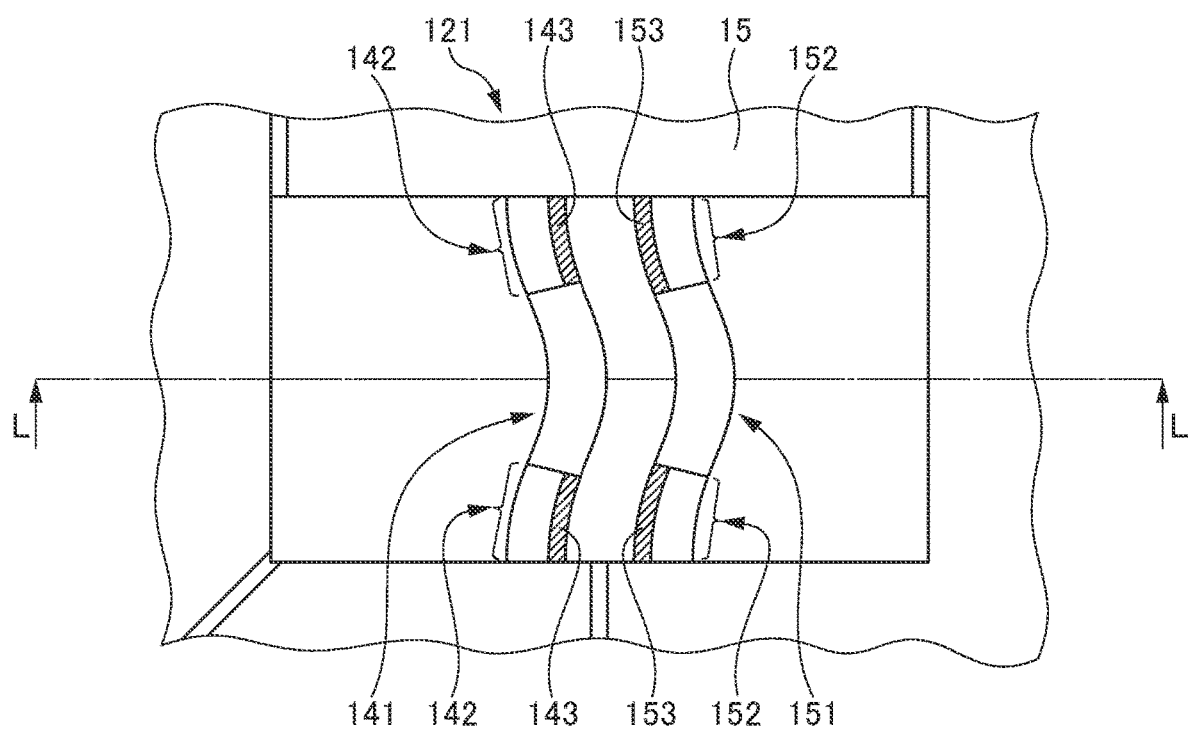
FIG. 16 shows a modified example of a beam structure.
Figure 17:
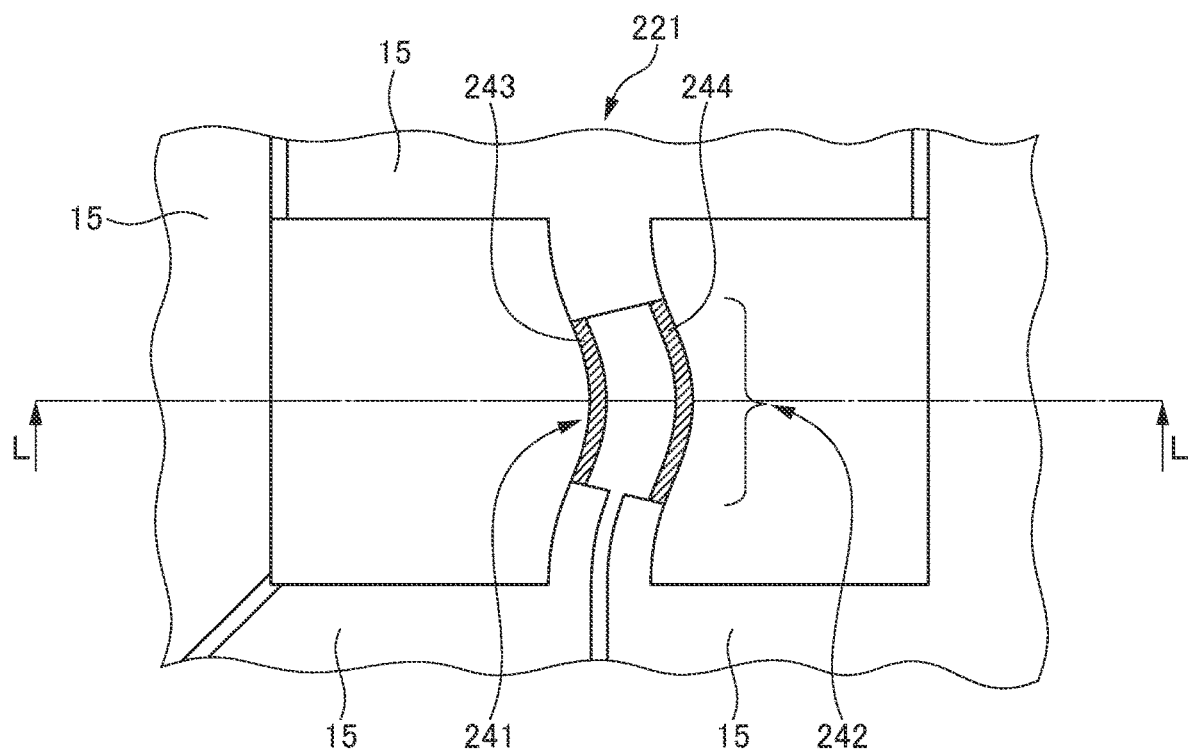
FIG. 17 shows a modified example of a beam structure.

Further, the elastic body 4 may bulge so that the portion of the surface corresponding to the center of the aforementioned radial arrangement becomes convex. That is to say, the elastic body 4 as a transmission material may have a bulge in its surface, and the highest position of this bulge and the center of the aforementioned radial arrangement may substantially match each other as seen in a top view of the multi-axial tactile sensor 1. Consequently, when the elastic body 4 initially makes contact with an object, the convex portion of the elastic body 4 is more likely to make contact first, so that a shearing force is only generated in a direction parallel to the directions in which the radially arranged beam structures extend. Therefore, when, for example, only a pressing force is applied, the voltage change amount output from the shearing force detecting elements will be extremely small. As such, the hardware can be configured to reduce interference from other axes as much as possible. In the beam structures of the present embodiment, the first and second resistive layers 43 and 53 are formed on the surfaces of the first beam 41 and the second beam 51 facing each other, in other words, the inner surfaces, but the first and second resistive layers may alternatively be formed on the outer surfaces (the surface facing away from the other beam) of the first beam 41 and the second beam 51. Alternatively, the beam structure may employ a pair of beam structures in which a first detecting section 142 having a first resistive layer 143 is provided to an end region of a first beam 141, and a second detecting section 152 having a second resistive layer 153 is provided to an end region of a second beam 151, as shown in FIG. 16. Even in this case, the first and second resistive layers 143 and 153 may be formed on the surfaces of the first beam 141 and the second beam 151 facing each other, in other words, the inner surfaces, as shown in FIG. 16, or the first and second resistive layers may be formed on the outer surfaces (the surface facing away from the other beam) of the first beam 141 and the second beam 151. Alternatively, the beam structure may employ a beam structure including one beam 241 having a detecting section 242 provided with resistive layers 243 and 244 on both side surfaces, as shown in FIG. 17. Further, the beam structure may employ a cantilever beam structure or a beam structure with three beams.

In addition, in order to detect the force in a direction of an axis and the moment about an axis, instead of an output using the bridge circuit, a value based on the resistance values of the first resistive layer and the second resistive layer may be used as an output of each sensor element. It should be noted that in addition to the sensor elements shown in the present embodiment, additional sensor elements may be provided.

The multi-axial tactile sensor 1 according to the present embodiment exhibits the following effects.

(1) The multi-axial tactile sensor 1 according to the present embodiment is a multi-axial tactile sensor 1 for detecting forces Fx, Fy, Fz in directions of three axes and moment about at least one axis of moments Mx, My, Mz about the three axes, including: a substrate 2; a plurality of sensor elements provided substantially at the same level as a surface of the substrate 2; and an elastic body 4 as a transmission material covering around the plurality of sensor elements and transmitting external force to the plurality of sensor elements, wherein the plurality of sensor elements include: at least four sensor elements including at least three shearing force detecting elements 20 having beam structures provided with a first resistive layer 43 and a second resistive layer 53 at specific portions to detect force in a direction parallel to the surface of the substrate 2; and at least one pressing force detecting element 30 having a beam structure provided with a third resistive layer 63 and a fourth resistive layer 73 at specific portions to detect force in a direction perpendicular to the surface of the substrate 2, the beam structures of the four sensor elements being arranged on the substrate 2 so that their respective longitudinal directions are radially arranged, and the moment about the at least one axis being detected based on outputs of two or more sensor elements being arranged at positions of rotational symmetry around a center of the radial arrangement of the plurality of sensor elements. This makes it possible to provide a multi-axial tactile sensor for detecting force in directions of three axes and moment about at least one axis, which is small and has high detection sensitivity.

(2) The multi-axial tactile sensor 1 according to the present embodiment is a multi-axial tactile sensor for detecting forces Fx, Fy, Fz in directions of three axes and moments Mx, My, Mz about the three axes, the plurality of sensor elements including: at least six sensor elements including at least three shearing force detecting elements 20; and at least three pressing force detecting elements 30, beam structures of the six sensor elements being arranged on the substrate 2 so that their respective longitudinal directions are radially arranged, and a moment about at least one axis of the moments about the three axes being detected based on outputs of two or more of the sensor elements being arranged at positions of rotational symmetry around a center of the radial arrangement of the plurality of sensor elements. This makes it possible to provide a multi-axial tactile sensor for detecting force in directions of three axes and moment about at least three axes, which is small and has high detection sensitivity.

(3) in the multi-axial tactile sensor 1 according to the present embodiment, the three pressing force detecting elements 31, 35, 34 are arranged at positions of three-fold symmetry around a center of the radial arrangement, and a moment about the X-axis is detected based on outputs of the three pressing force detecting elements 31, 35, 34 being arranged at the positions of three-fold symmetry. This makes it possible to provide a multi-axial tactile sensor for detecting force in directions of three axes and moment about at least three axes, which is small and has high detection sensitivity.

(4) The multi-axial tactile sensor 1 according to the present embodiment is a multi-axial tactile sensor for detecting forces Fx, Fy, Fz in directions of three axes and moments Mx, My, Mz about the three axes, the plurality of sensor elements including: at least eight sensor elements including at least four shearing force detecting elements 21, 22, 23, 24; and at least four pressing force detecting elements 31, 32, 33, 34, beam structures of the eight sensor elements being arranged on a sensor substrate 2 so that their respective longitudinal directions are radially arranged, moments about at least two axes of the moments about the three axes being detected based on outputs of four or more pressing force detecting elements 31, 32, 33, 34 being arranged at positions of rotational symmetry around a center of the radial arrangement of the plurality of sensor elements, and the forces in the directions of the three axes being respectively detected based on outputs of two or more sensor elements being arranged at positions of rotational symmetry around the center of the radial arrangement of the plurality of sensor elements. This makes it possible to provide a multi-axial tactile sensor for detecting force in directions of three axes and moment about at least three axes, which is small and has extremely high detection sensitivity.

(5) In the multi-axial tactile sensor 1 according to the present embodiment, the moments about the three axes are respectively detected based on outputs of four sensor elements being arranged at positions of four-fold symmetry around a center of the radial arrangement of the plurality of sensor elements, and a force in a direction of at least one axis of the forces in the directions of the three axes is detected based on outputs of four pressing force detecting elements being arranged at positions of four-fold symmetry around the center of the radial arrangement of the plurality of sensor elements. This makes it possible to provide a multi-axial tactile sensor for detecting force in directions of three axes and moment about at least three axes, which has even higher detection sensitivity than (4).

(6) In the multi-axial tactile sensor 1 according to the present embodiment, the beam structures of the plurality of sensor elements are respectively constituted by two beams having both ends supported by the sensor substrate 2, being parallel to each other, and being provided parallel to the sensor substrate 2, the two beams being constituted by a first beam having a first detecting section having a first resistive layer formed on a surface that deforms by extending or contracting due to external force, and a second beam having a second detecting section having a second resistive layer formed on a surface that deforms by extending or contracting due to external force in as opposite manner to the first detecting section. This makes it possible to effectively cancel out variations in resistance values due to changes in temperature and interference from other axes.

The present invention is not limited to the above embodiments, and may be suitably changed and modified within a range in which the object of the present invention can be achieved.

The invention claimed is:

1. A multi-axial tactile sensor for detecting forces in directions of three axes and a moment about at least one axis of the three axes, comprising:
    a substrate;
    a plurality of sensor elements provided substantially at a same level as a surface of the substrate; and
    a transmission material covering around the plurality of sensor elements and transmitting external force to the plurality of sensor elements,
    wherein
    the plurality of sensor elements include:
    at least four sensor elements including at least three shearing force detecting elements having beam structures provided with resistive layers at specific portions to detect force in a direction parallel to the surface of the substrate; and
    at least one pressing force detecting element having a beam structure provided with resistive layers at specific portions to detect force in a direction perpendicular to the surface of the substrate,
    the beam structures of the four sensor elements arranged on the substrate so that their respective longitudinal directions are radially arranged, and
    the moment about the at least one axis being detected based on outputs of two or more sensor elements arranged at positions of rotational symmetry around a center of the radial arrangement of the plurality of sensor elements.

2. The multi-axial tactile sensor according to claim 1, wherein the multi-axial tactile sensor is a multi-axial tactile sensor for detecting forces in directions of three axes and moments about the three axes,
    the plurality of sensor elements including:
    at least six sensor elements including at least three shearing force detecting elements having beam structures provided with resistive layers at specific portions to detect force in a direction parallel to the surface of the substrate; and
    at least three pressing force detecting elements having beam structures provided with resistive layers at specific portions to detect force in a direction perpendicular to the surface of the substrate,
    the beam structures of the six sensor elements arranged on the substrate so that their respective longitudinal directions are radially arranged, and
    a moment about at least one axis of the moments about the three axes being detected based on outputs of two or more of the sensor elements arranged at positions of rotational symmetry around a center of the radial arrangement of the plurality of sensor elements.

3. The multi-axial tactile sensor according to claim 2, wherein the three pressing force detecting elements are arranged at positions of three-fold symmetry around a center of the radial arrangement, a moment about at least one axis of the moments about the three axes being detected based on outputs of the three pressing force detecting elements arranged at the positions of three-fold symmetry.

4. The multi-axial tactile sensor according to claim 3, wherein the beam structures of the plurality of sensor elements are respectively formed by two beams having both ends supported by the substrate, parallel to each other, and provided parallel to the substrate,
  the two beams formed by a first beam having a first detecting section having a first resistive layer formed on a surface that deforms by extending or contracting due to external force, and
  a second beam having a second detecting section having a second resistive layer formed on a surface that deforms by extending or contracting due to external force in an opposite manner to the first detecting section.

5. The multi-axial tactile sensor according to claim 2, wherein the multi-axial tactile sensor is a multi-axial tactile sensor for detecting forces in directions of three axes and moments about the three axes,
  the plurality of sensor elements include:
  at least eight sensor elements including at least four shearing force detecting elements having beam structures provided with resistive layers at specific portions to detect force in a direction parallel to the surface of the substrate; and
  at least four pressing force detecting elements having beam structures provided with resistive layers at specific portions to detect force in a direction perpendicular to the surface of the substrate,
  the beam structures of the eight sensor elements arranged on the substrate so that their respective longitudinal directions are radially arranged,
  moments about at least two axes of the moments about the three axes being detected based on outputs of four or more of the pressing force detecting elements arranged at positions of rotational symmetry around a center of the radial arrangement of the plurality of sensor elements, and
  the forces in the directions of the three axes being respectively detected based on outputs of two or more of the sensor elements arranged at positions of rotational symmetry around the center of the radial arrangement of the plurality of sensor elements.

6. The multi-axial tactile sensor according to claim 5, wherein the moments about the three axes are respectively detected based on outputs of four of the sensor elements arranged at positions of four-fold symmetry around a center of the radial arrangement of the plurality of sensor elements, and
  a force in a direction of at least one axis of the forces in the directions of the three axes is detected based on outputs of four of the pressing force detecting elements arranged at positions of four-fold symmetry around the center of the radial arrangement of the plurality of sensor elements.

7. The multi-axial tactile sensor according to claim 6, wherein the beam structures of the plurality of sensor elements are respectively formed by two beams having both ends supported by the substrate, parallel to each other, and provided parallel to the substrate,
  the two beams formed by a first beam having a first detecting section having a first resistive layer formed on a surface that deforms by extending or contracting due to external force, and
  a second beam having a second detecting section having a second resistive layer formed on a surface that deforms by extending or contracting due to external force in an opposite manner to the first detecting section.

8. The multi-axial tactile sensor according to claim 5, wherein the beam structures of the plurality of sensor elements are respectively formed by two beams having both ends supported by the substrate, parallel to each other, and provided parallel to the substrate,
  the two beams formed by a first beam having a first detecting section having a first resistive layer formed on a surface that deforms by extending or contracting due to external force, and
  a second beam having a second detecting section having a second resistive layer formed on a surface that deforms by extending or contracting due to external force in an opposite manner to the first detecting section.

9. The multi-axial tactile sensor according to claim 2, wherein the beam structures of the plurality of sensor elements are respectively formed by two beams having both ends supported by the substrate, parallel to each other, and provided parallel to the substrate,
  the two beams formed by a first beam having a first detecting section having a first resistive layer formed on a surface that deforms by extending or contracting due to external force, and
  a second beam having a second detecting section having a second resistive layer formed on a surface that deforms by extending or contracting due to external force in an opposite manner to the first detecting section.

10. The multi-axial tactile sensor according to claim 1, wherein the beam structures of the plurality of sensor elements are respectively formed by two beams having both ends supported by the substrate, parallel to each other, and provided parallel to the substrate,
  the two beams formed by a first beam having a first detecting section having a first resistive layer formed on a surface that deforms by extending or contracting due to external force, and
  a second beam having a second detecting section having a second resistive layer formed on a surface that deforms by extending or contracting due to external force in an opposite manner to the first detecting section.

* * * * *